(12) United States Patent
Iwamatsu et al.

(10) Patent No.: US 6,348,961 B2
(45) Date of Patent: *Feb. 19, 2002

(54) LIQUID CRYSTAL COMPOSITION AND LIQUID CRYSTAL LIGHT MODULATING DEVICE

(75) Inventors: Masako Iwamatsu, Toyonaka; Nobuyuki Kobayashi, Kobe; Hideaki Ueda, Kishiwada, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

(21) Appl. No.: 09/370,427

(22) Filed: Aug. 9, 1999

(30) Foreign Application Priority Data

Aug. 18, 1998 (JP) .............................. 10-231921
Apr. 28, 1999 (JP) .............................. 11-122268

(51) Int. Cl.$^7$ ................................. G02F 1/13
(52) U.S. Cl. .................. 349/175; 349/181; 349/177; 349/176; 252/299.7
(58) Field of Search .................. 349/175, 176, 349/177, 181; 252/299.01, 299.7

(56) References Cited

U.S. PATENT DOCUMENTS

| 5,344,587 A | * | 9/1994 | Coates et al. | .......... 252/299.66 |
|---|---|---|---|---|
| 5,384,067 A | | 1/1995 | Doane et al. | .......... 252/299.01 |
| 5,437,811 A | | 8/1995 | Doane et al. | .......... 252/299.01 |
| 5,453,863 A | | 9/1995 | West et al. | .................... 359/91 |
| 5,993,692 A | * | 11/1999 | Shimizu et al. | ......... 252/299.61 |
| 6,004,478 A | * | 12/1999 | Shimizu et al. | ......... 252/299.61 |
| 6,010,642 A | * | 1/2000 | Takatsu et al. | .......... 252/299.6 |

FOREIGN PATENT DOCUMENTS

| JP | 5-224187 | 9/1993 |
|---|---|---|
| JP | 5-241119 | 9/1993 |
| JP | 6-507505 | 8/1994 |
| WO | WO9219695 | 11/1992 |

* cited by examiner

Primary Examiner—James A. Dudek
(74) Attorney, Agent, or Firm—Sidley Austin Brown & Wood

(57) ABSTRACT

A reflective type liquid crystal display which has a liquid crystal composition exhibiting a cholesteric phase in a room temperature and a columnar structure between substrates with ITO electrodes thereon. The liquid crystal composition is a chiral nematic liquid crystal composition which is produced by adding a chiral agent at a ratio within a range from 10 wt % to 45 wt % to nematic liquid crystal which contains a nematic liquid crystal component with a polar group at not less than 25 wt % and of which transition temperature to isotropic phase is within a range from 70° C. to 150° C. The anisotropy of refractive index of the liquid crystal composition is 0.10 to 0.22, and the anisotropy of dielectric constant is 5 to 30.

15 Claims, 2 Drawing Sheets

FIG. 1
FIG. 1a
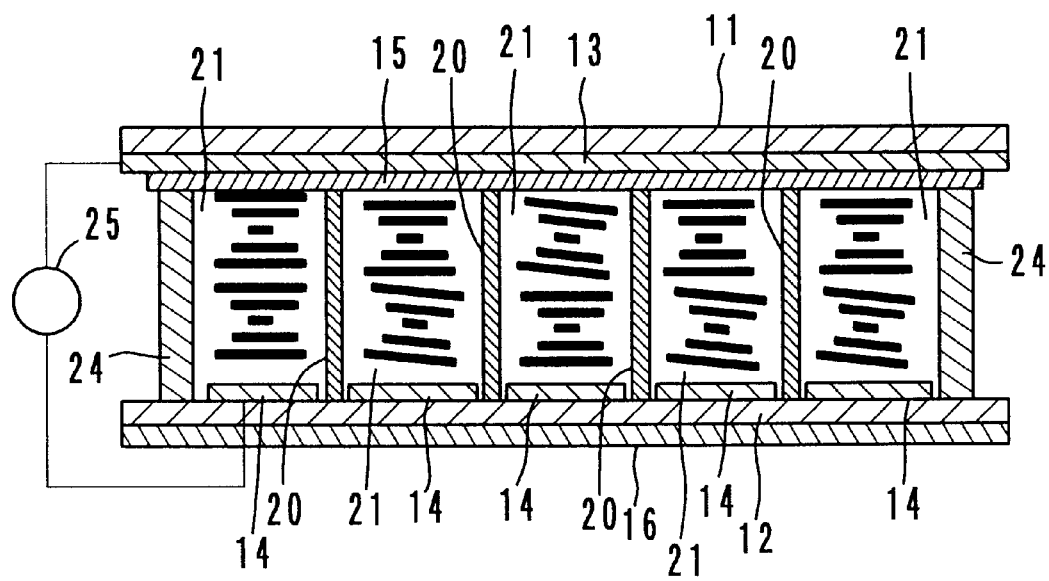
FIG. 1b
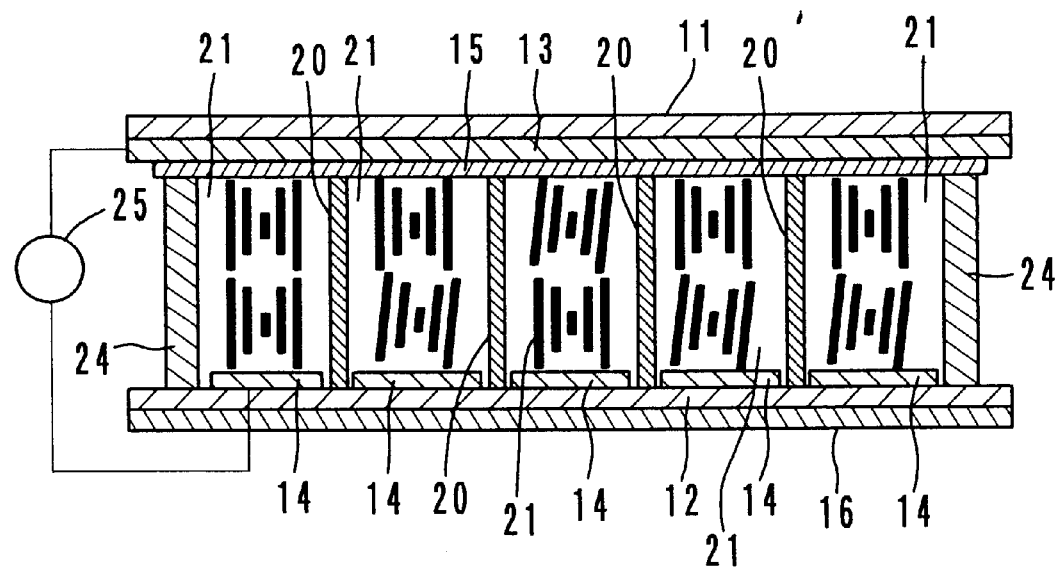

LIQUID CRYSTAL COMPOSITION AND LIQUID CRYSTAL LIGHT MODULATING DEVICE

This application is based on applications No. 10-231921 and No. 11-122268 filed in Japan, the contents of which is hereby incorporated by reference.

BACKGROUND OF THE INVENTION

1. Field of the Invention

The present invention relates to a liquid crystal composition which exhibits a cholesteric phase at room temperature and a reflective type liquid crystal light modulating device provided with the liquid crystal composition.

2. Description of the Related Art

Recently, studies have been made to develop reflective liquid crystal displays by using chiral nematic liquid crystal which is produced by adding a chiral agent to nematic liquid crystal to cause the liquid crystal to exhibit a cholesteric phase at room temperature. Such a liquid crystal display makes a display by switching between a planar state (color) and a focal-conic state (transparent) in accordance with the level of the pulse voltage applied thereto. The planar state and the focal-conic state can be maintained after the application of the pulse voltage (which is referred to as bistability or non-volatility), whereby the display can be maintained even after voltage is no longer applied.

At present, however, in such a reflective liquid crystal display, the reflectance is low, and the contrast between the planar state and the focal-conic state is not sufficiently high, and liquid crystal displays of this type which are satisfactory in performance such as color purity (excitation purity), etc. are yet to be developed. To this type of liquid crystal displays, it is also important to have a wide temperature range in which practical display performance is possible.

SUMMARY OF THE INVENTION

It is an object of the present invention to provide a liquid crystal composition which, when it is used for a liquid crystal light modulating device such as a liquid crystal display, is good in color purity, reflectance, etc., has a wide temperature range which permits practical display performance and is driven by a low voltage.

Another object of the present invention is to provide a liquid crystal light modulating device which is good in color purity, reflectance, etc., has a wide temperature range which permits practical display performance and is driven by a low voltage.

In order to attain the objects, a liquid crystal composition according to the present invention is a chiral nematic liquid crystal composition which exhibits a cholesteric phase in a room temperature and is produced by adding a chiral agent at a ratio within a range from 10 wt % to 45 wt % to nematic liquid crystal which contains a nematic liquid crystal component with a polar group at not less than 25 wt % and a transition temperature to the isotropic phase in a range from 70° to 150°. The anisotropy of refractive index of the liquid crystal composition is 0.10 to 0.22, and the anisotropy of dielectric constant is 5 to 30.

A liquid crystal light modulating device according to the present invention comprises the above-described liquid crystal composition and a space maintaining member between a pair of substrates at least one of which is light transmitting.

As the nematic liquid crystal component with a polar group, nematic liquid crystal with a polar bonding group in the molecular structure and nematic liquid crystal with a polar group as a substituent can be used. For example, a liquid crystal ester compound with an ester bonding group, a compound with a polar group in the molecule such as a liquid crystal pyrimidine compound of a pyrimidine structure, a liquid crystal tolane compound, a liquid crystal ester compound, a liquid crystal pyrimidine compound or the like which has a polar group such as a fluorine atom, a fluoroalkyl group, a cyano group as a substituent can be named.

As the other component of the nematic liquid crystal, it is preferred to use nematic liquid crystal with a low viscosity. For example, a liquid crystal tolan compound with alkyl groups at both ends, a liquid crystal phenylcyclohexane (PCH) compound with alkyl groups at both ends, etc. can be named as the nematic liquid crystal with a low viscosity. Further, a liquid crystal polycyclic (tricyclic or more) compound with no polar groups may be added so as to control the transition temperature to isotropic phase, or a liquid crystal tolan compound with no polar groups or a liquid crystal polycyclic compound may be added so as to control the anisotropy of refractive index.

If the anisotropy of refractive index is too low, the quantity of scattered light will be small. Consequently, coloring in the planar state will be weak, and the reflectance will not be sufficient. On the other hand, if the anisotropy of refractive index is too high, the quantity of scattered light will be too large, and the transparency or the black display in the focal-conic state will be bad. Consequently, the display performance will be poor. According to the present invention, the anisotropy of refractive index is regulated to a value within a: range from 0.1 to 0.22. Thereby, both the color portions and the transparent portions are good in reflectance, and satisfactory contrast can be obtained.

Also, the anisotropy of dielectric constant is regulated to be not more than 30. Thereby, when a liquid crystal light modulating device is fabricated by use of the liquid crystal composition, the peripheral materials such as a sealing material are prevented from diffusing into the liquid crystal, and the reliability of the device can be improved. If the anisotropy of dielectric constant is less than 5, a high driving voltage will be necessary. If the transition temperature to isotropic phase of the nematic liquid crystal is lower than 70° C., the temperature range which permits practical display performance will be narrow. If the transition temperature to isotropic phase is higher than 150° C., the liquid crystal will be crystallized easily by addition of a chiral agent.

BRIEF DESCRIPTION OF THE DRAWINGS

These and other objects and features of the present invention will be apparent from the following description with reference to the accompanying drawings, in which:

FIG. 1 is composed of 1a and 1b which are sectional views of a liquid crystal display as the first embodiment, FIG. 1a showing the liquid crystal display in a planar state and FIG. 1b showing the liquid crystal dismay in a focal-conic state;

DETAILED DESCRIPTION OF THE PREFERRED EMBODIMENTS

Figure 2:
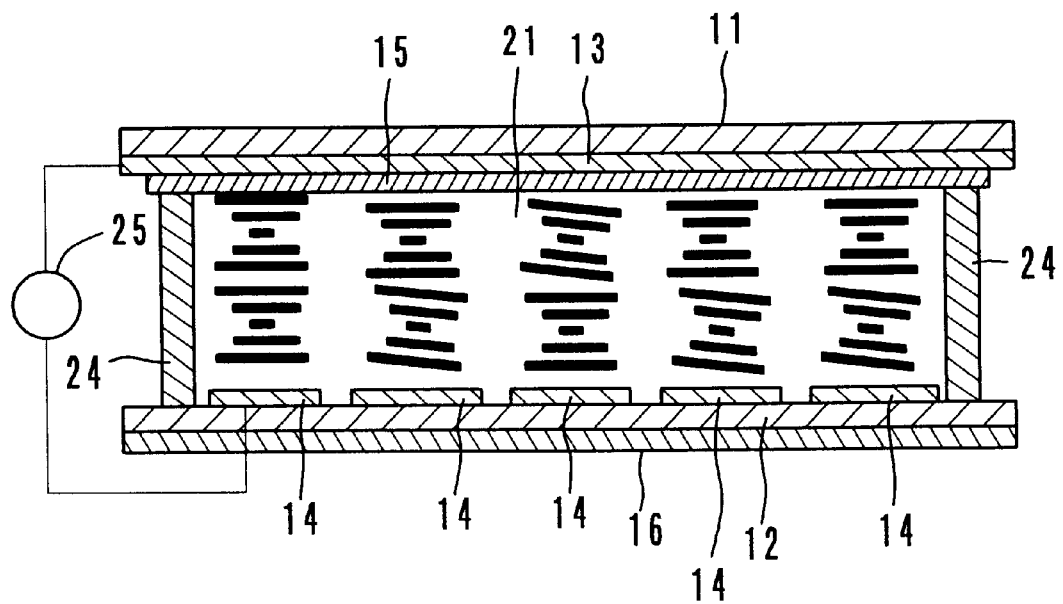
FIG. 2 is a sectional view of a liquid crystal display as the second embodiment.

Preferred embodiments of a liquid crystal composition and a liquid crystal light modulating device according to the present invention are described with reference to the accompanying drawings.

Structure and Display Operation of the First Embodiment

FIG. 1 is a sectional view of a liquid crystal display according to the first embodiment of the present invention. FIG. 1a shows a planar state (RGB coloring state) in which a high pulse voltage is applied to the liquid crystal display, and FIG. 1b shows a focal-conic state (transparent/black display state) in which a low pulse voltage is applied to the liquid crystal display. The liquid crystal display has non-volatility, and the planar state and the focal-conic state are maintained even after stoppage of the application of the pulse voltage.

In FIG. 1, the numbers 11 and 12 are transparent substrates, on which transparent electrodes 13 and 14 are formed, respectively. The electrodes 13 and 14 are in the form of strips, and the respective electrode strips 13 and 14 are arranged in parallel. The extending direction of the electrode strips 13 and the extending direction of the electrode strips 14 cross each other, and the electrodes 13 and 14 face each other. It is preferred that an insulating layer 15 is provided on the electrode strips 13. In addition, on the reverse side of the substrate 12, a visible light absorbing layer 16 is provided if necessary.

The number 20 is a columnar structure serving as a space maintaining member, and the number 21 is a liquid crystal composition which exhibits a cholesteric phase in a room temperature. The materials of these members and combinations thereof will be described later and further specific descriptions will be made referring to examples. The number 24 denotes a seal which is to seal the liquid crystal composition 21 between the substrates 11 and 12. The number 25 denotes a pulse electric source and applies a pulse voltage to the electrodes 13 and 14.

In the liquid crystal display of the above structure, a display is made by application of a pulse voltage from the electric source 25 to the electrodes 13 and 14. Specifically, if the liquid crystal composition 21 is one which exhibits a cholesteric phase, when a pulse voltage with comparatively high energy is applied thereto, the liquid crystal comes to a planar state and selectively reflects light of a wavelength determined by the cholesteric pitch and the refractive index. When a pulse voltage with comparatively low energy is applied, the liquid crystal comes to a focal-conic state and becomes transparent. Each of the states is maintained even after stoppage of the application of the voltage.

It has been found that an intermediate state between the focal-conic state and the planar state exists, and by applying a pulse voltage with medium energy to the liquid crystal, a display with a medium tone is possible. In the intermediate state, the focal-conic state and the planar state mix together, and this intermediate state is maintained even after stoppage of the application of the voltage. Further, as FIG. 1 shows, when the visible light absorbing layer 16 is provided, a black display is made in the focal-conic state.

In the liquid crystal display, the intersections of the electrode strips 13 and 14 are display pixels. In the following paragraphs, the area where light modulation is carried out by the liquid crystal is referred to as display area, and the periphery of the display area is a non-display area in which light modulation is not carried out.

Substrate

At least one of the substrates 11 and 12 must be light transmitting. For a transparent substrate, not only glass but also flexible material such as polycarbonate, polyether sulfone, polyethylene terephthalate, etc. can be used.

Electrode

For the electrodes 13 and 14, transparent conductive films typically of ITO (indium tin oxide), metal such as aluminum, silicone, etc., photoconductive films of amorphous silicone, BSO (bismuth silicone oxide) etc. can be used. In order to form the electrodes 13 and 14 in a matrix, for example, an ITO film is formed on each of the substrates 11 and 12 by sputtering, and the ITO film is patterned by photolithography.

Insulating Layer, Alignment Controlling Layer

The insulating layer 15 is an inorganic film of e.g. silicone oxide or an organic film of e.g. polyimide resin, epoxy resin, acrylic resin or urethane resin. The insulating layer 15 functions as a preventive of short-circuit between the electrodes 13 and 14 and as a gas barrier layer to improve the reliability of the liquid crystal. Also, if polyimide resin or silicone resin is used, the layer 15 also functions as an alignment controlling layer. In addition, if a coloring agent is added, it will also functions as a color filter. Further, the polymeric material which is used for the columnar structure 20 can be used for the insulating layer 15.

Spacers

Although they are not shown in the drawings, spacers may be provided between the substrates 11 and 12. The spacers are spherical and made of resin or inorganic oxide. The spacers are to maintain the gap between the substrates 11 and 12 even. It is possible to use the spherical spacers as a space maintaining member instead of the columnar structure 20.

Liquid Crystal Composition

The liquid crystal composition is a chiral nematic liquid crystal composition which is produced by adding a chiral agent at a ratio within a range from 10 wt % to 45 wt % to nematic liquid crystal which contains a nematic liquid crystal component with large polarization at not less than 25 wt %, desirably 30 to 90 wt %, and more desirably 45 to 80 wt % and of which transition temperature to isotropic phase is within a range from 70° C. to 150° C. The anisotropy of refractive index of the chiral nematic liquid crystal composition is 0.10 to 0.22, and the anisotropy of dielectric constant is 5 to 30. Further, a dye may be added.

The wavelength to be selectively reflected by the liquid crystal composition can be controlled by changing the content of the chiral agent in the liquid crystal composition. In general, by increasing the content of the chiral agent, the wavelength to be reflected by the liquid crystal composition becomes shorter. The wavelength to be selectively reflected by the liquid crystal composition means the peak wavelength in the visible light wavelength range of the reflectance spectrum in the planar state of the liquid crystal realized by application of a high pulse voltage to the electrodes 13 and 14.

The following general chemical formula (A) and specific chemical formulas ($A_1$) through ($A_{112}$) show liquid crystal tolan compounds which are usable as nematic liquid crystal. The compounds shown by the chemical formulas ($A_{21}$), ($A_{31}$) through ($A_{33}$), ($A_{39}$) through ($A_{47}$), ($A_{61}$) through ($A_{76}$), ($A_{78}$), ($A_{79}$), ($A_{83}$) through ($A_{89}$), ($A_{100}$) through ($A_{106}$) correspond to nematic liquid crystal with a polar group.

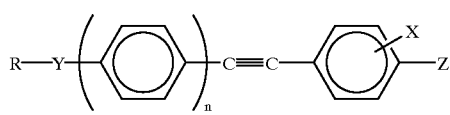
(A)

R: alkyl, alkenyl or alkoxyl with one to ten carbons
x: fluorine or hydrogen
Y: cyclohexyl, bicyclohexyl or single bond
Z: fluorine, fluoroalkyl, cyano, or alkyl, alkenyl or alkoxyl with one to ten carbons, or the group shown by the following chemical formula

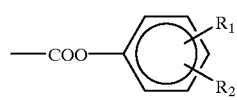

$R_1, R_2$: hydrogen, halogen or alkyl with one to ten carbons
n: 1 or 2

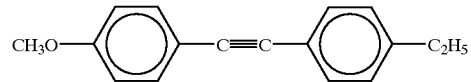 (A₁)

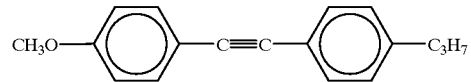 (A₂)

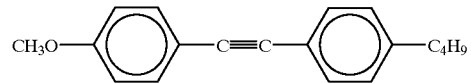 (A₃)

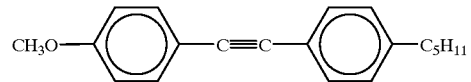 (A₄)

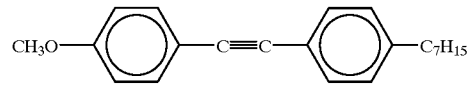 (A₅)

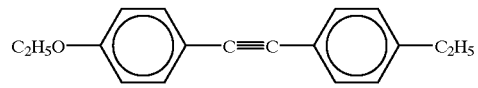 (A₆)

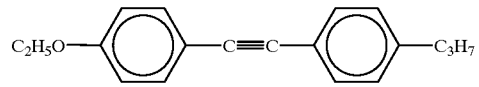 (A₇)

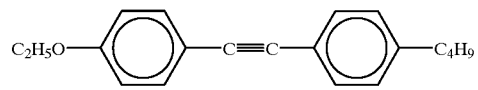 (A₈)

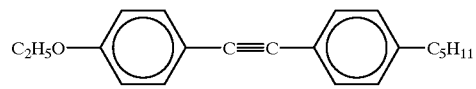 (A₉)

-continued

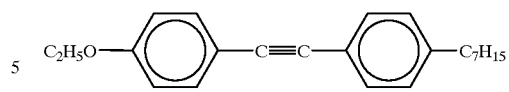 (A₁₀)

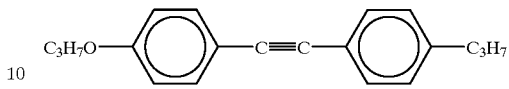 (A₁₁)

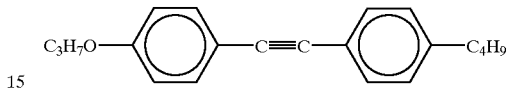 (A₁₂)

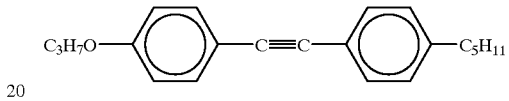 (A₁₃)

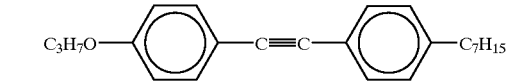 (A₁₄)

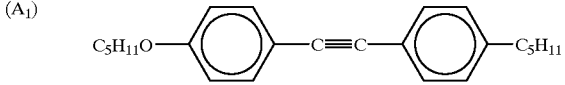 (A₁₅)

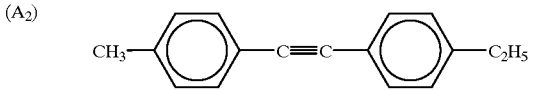 (A₁₆)

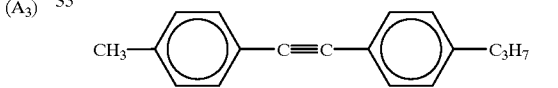 (A₁₇)

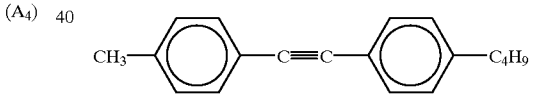 (A₁₈)

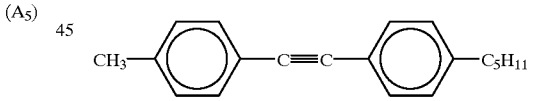 (A₁₉)

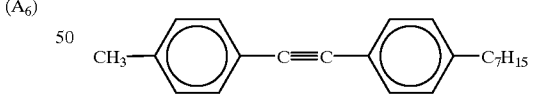 (A₂₀)

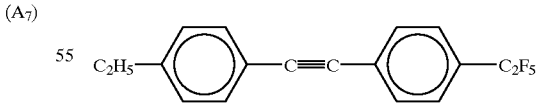 (A₂₁)

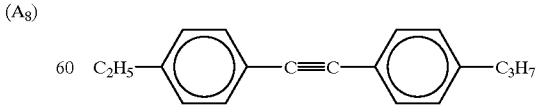 (A₂₂)

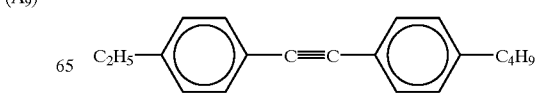 (A₂₃)

-continued
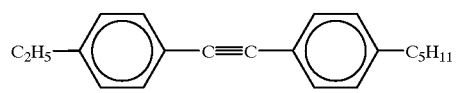
(A24)
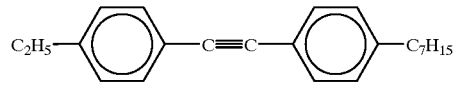
(A25)
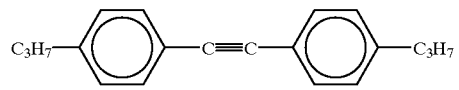
(A26)
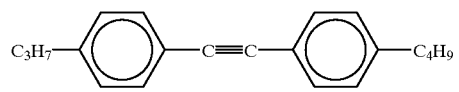
(A27)
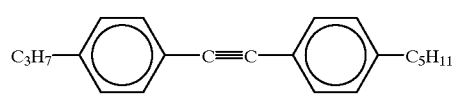
(A28)
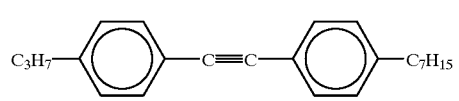
(A29)
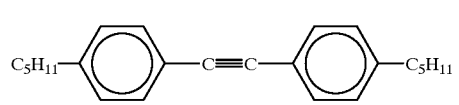
(A30)
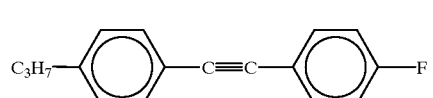
(A31)
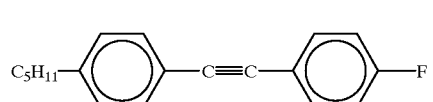
(A32)
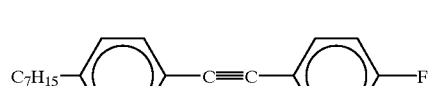
(A33)
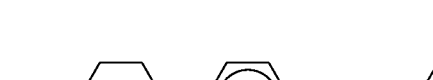
(A34)
(A35)
(A36)
-continued
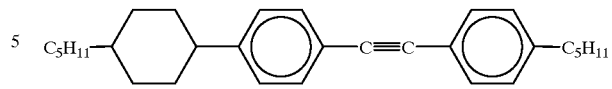
(A37)
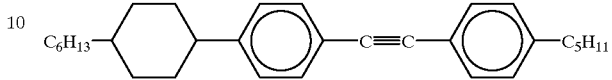
(A38)
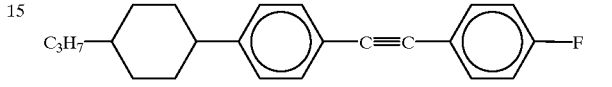
(A39)
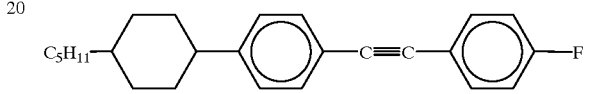
(A40)
(A41)
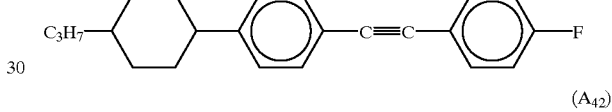
(A42)
(A43)
(A44)
(A45)
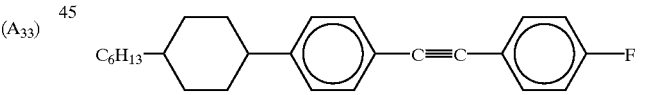
(A46)
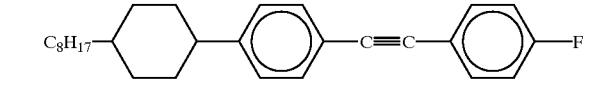
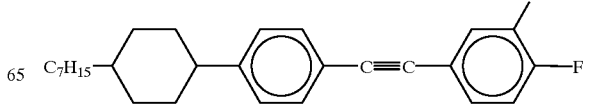
(A47)

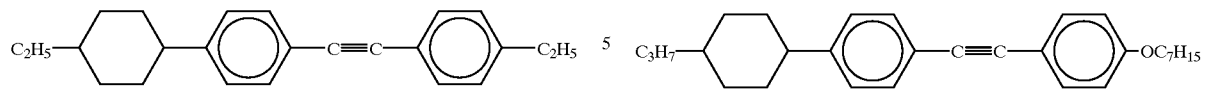
(A48)
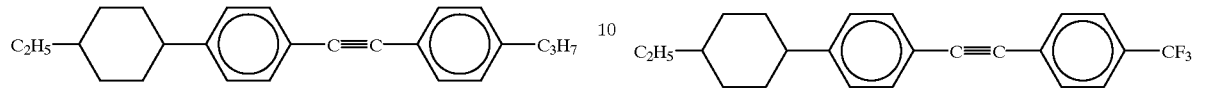
(A49)
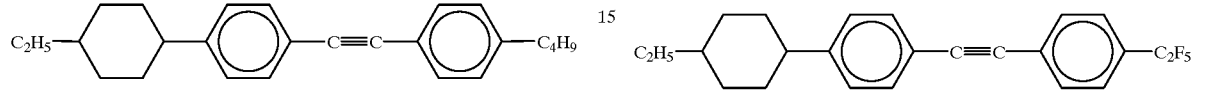
(A50)
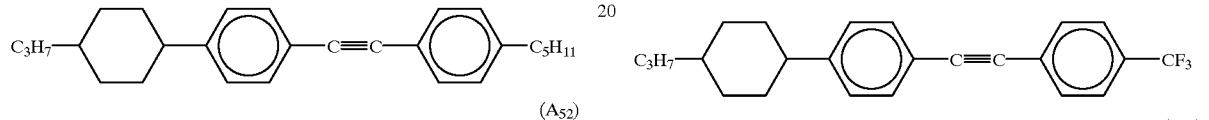
(A51)
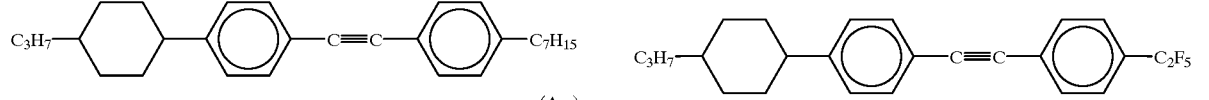
(A52)
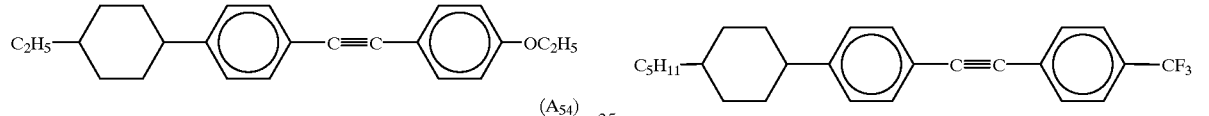
(A53)
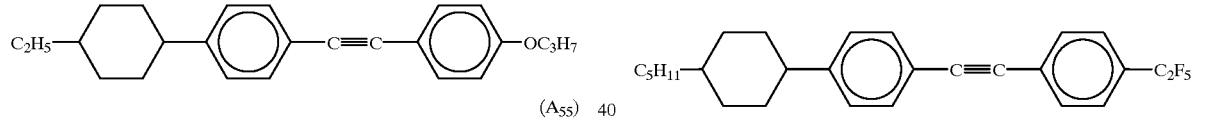
(A54)
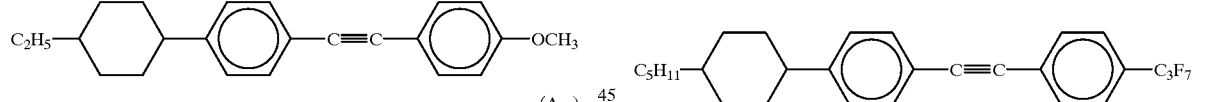
(A55)
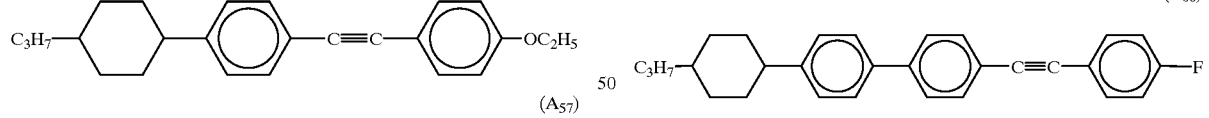
(A56)
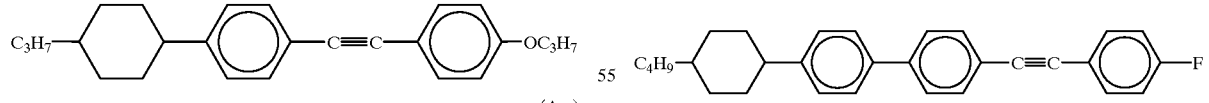
(A57)
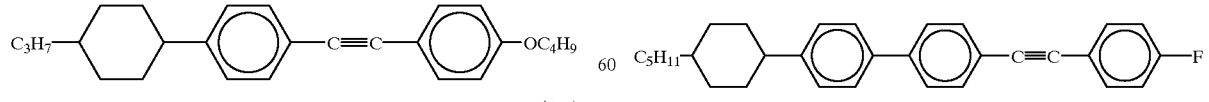
(A58)
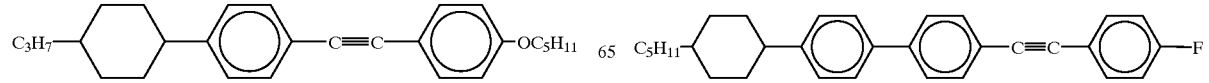
(A59)

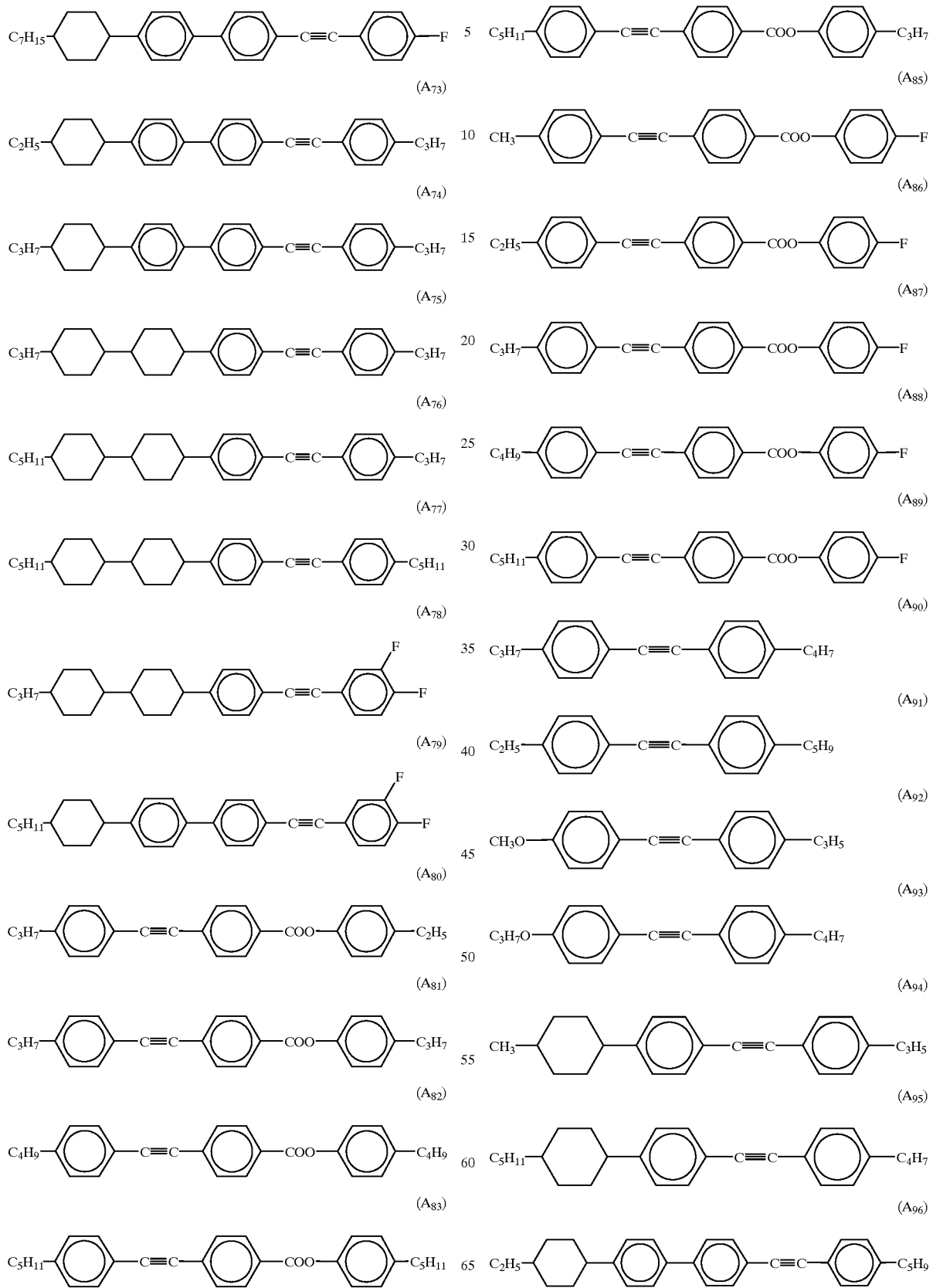

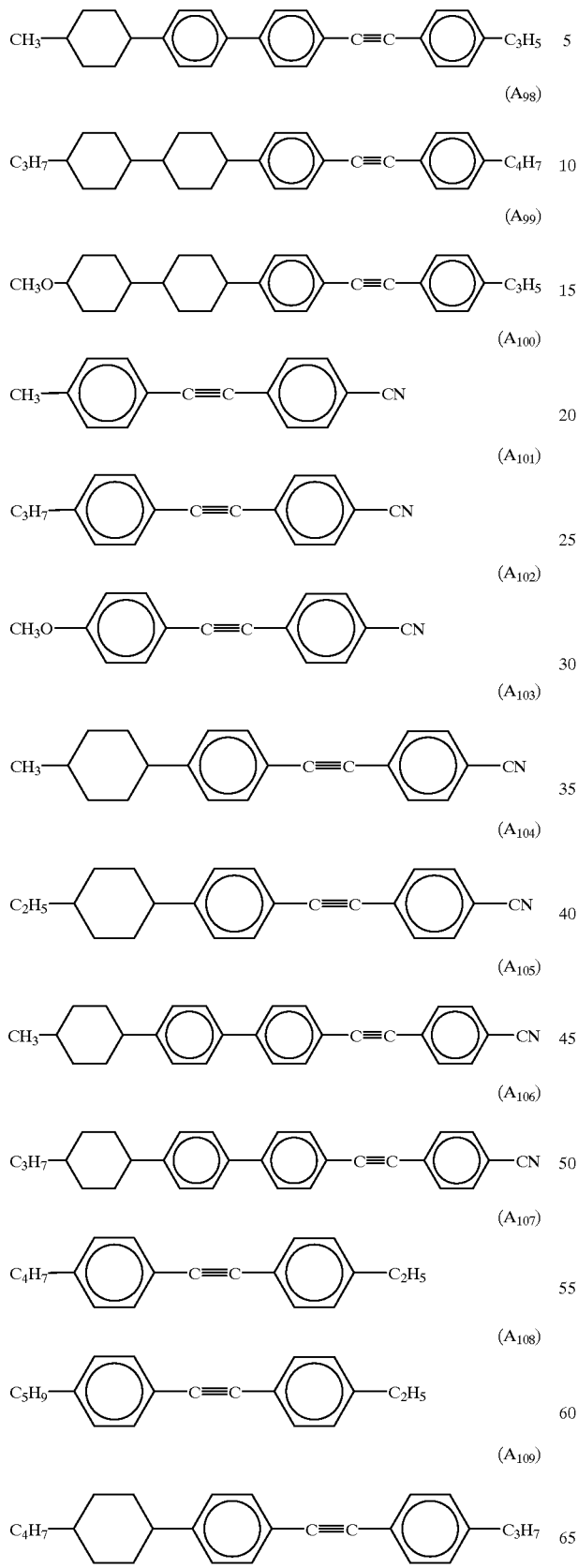

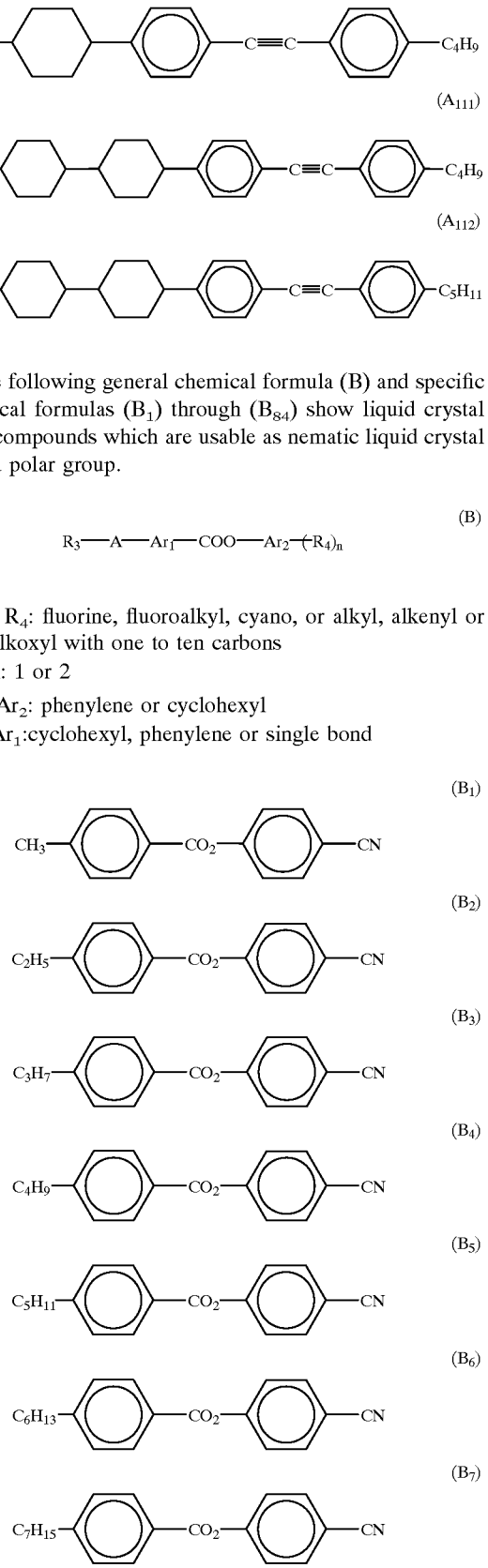

The following general chemical formula (B) and specific chemical formulas ($B_1$) through ($B_{84}$) show liquid crystal ester compounds which are usable as nematic liquid crystal with a polar group.

$$R_3-A-Ar_1-COO-Ar_2-(R_4)_n \quad (B)$$

$R_3$, $R_4$: fluorine, fluoroalkyl, cyano, or alkyl, alkenyl or alkoxyl with one to ten carbons n: 1 or 2

A, $Ar_2$: phenylene or cyclohexyl $Ar_1$: cyclohexyl, phenylene or single bond

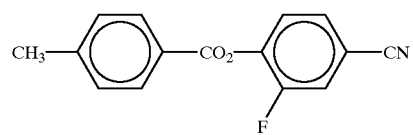 (B8)
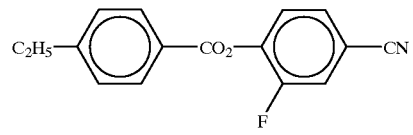 (B9)
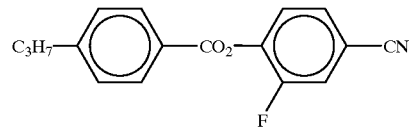 (B10)
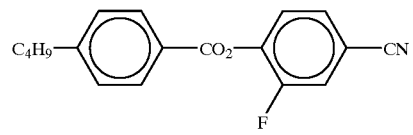 (B11)
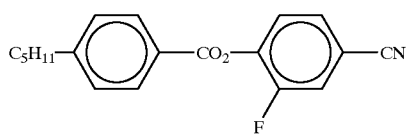 (B12)
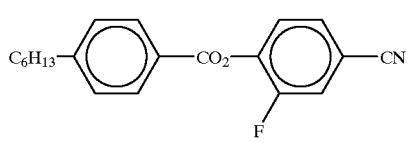 (B13)
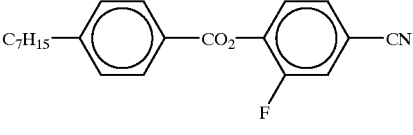 (B14)
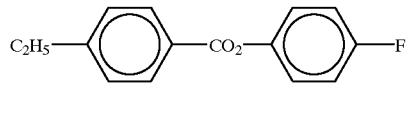 (B15)
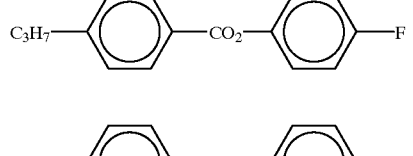 (B16)
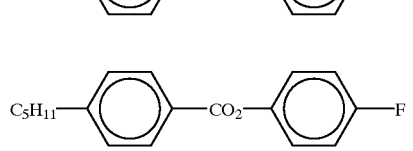 (B17)
 (B18)
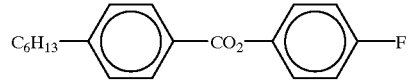 (B19)
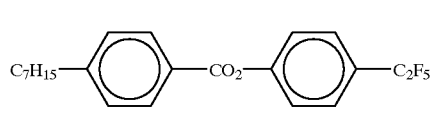 (B20)
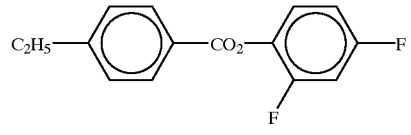 (B21)
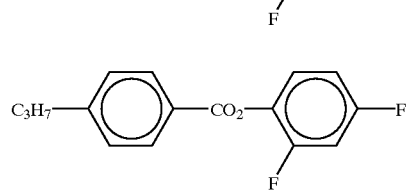 (B22)
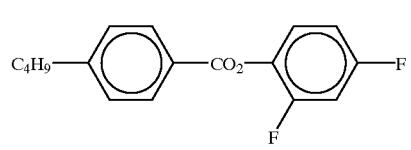 (B23)
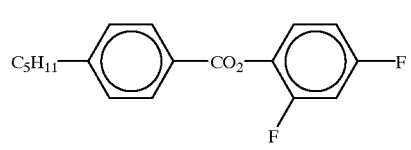 (B24)
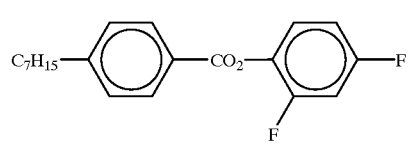 (B25)
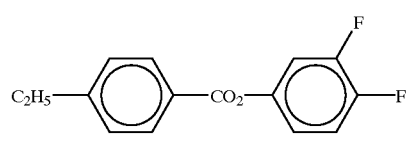 (B26)
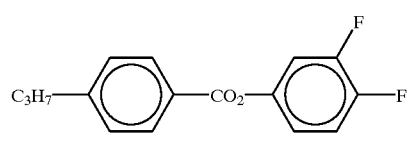 (B27)
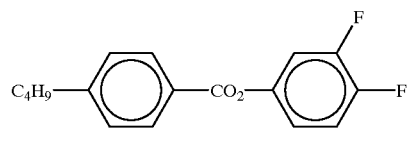 (B28)
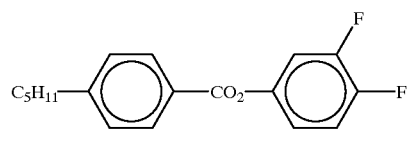 (B29)

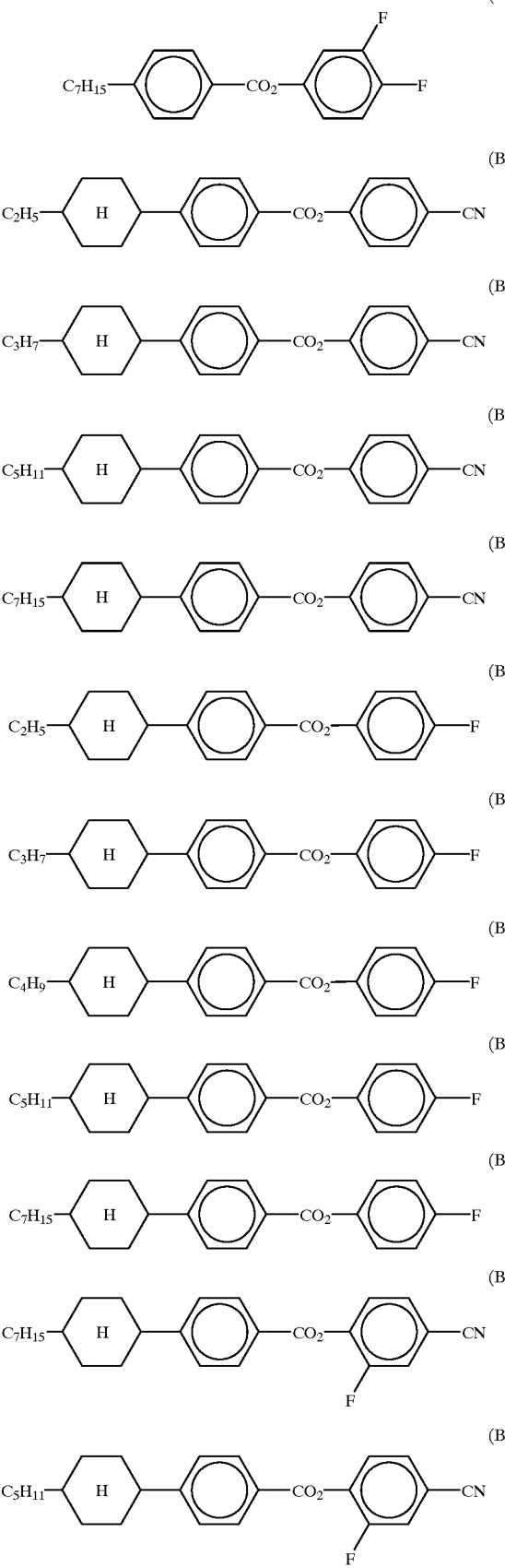
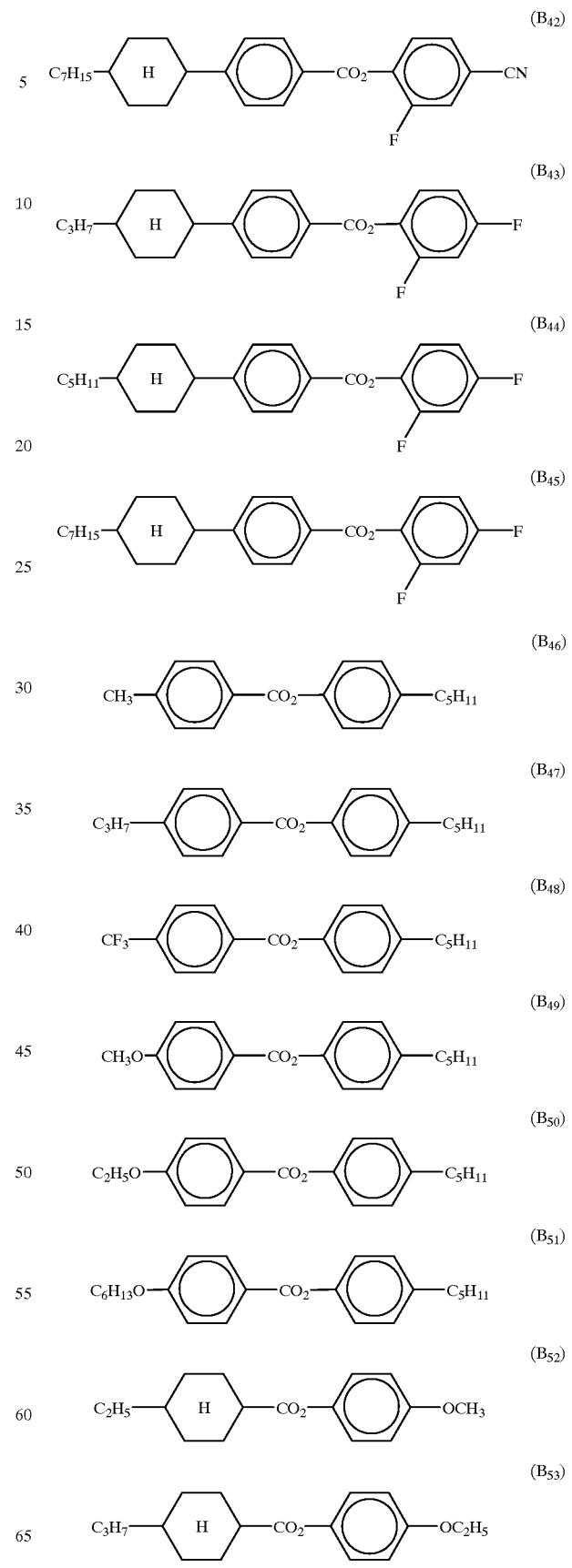

(B54) 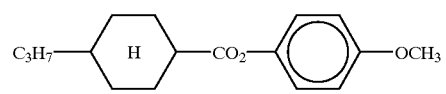
(B55) 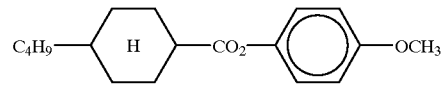
(B56) 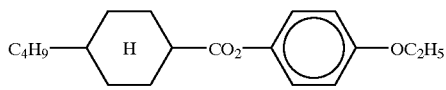
(B57) 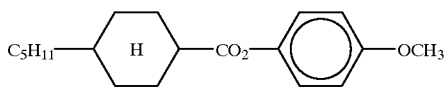
(B58) 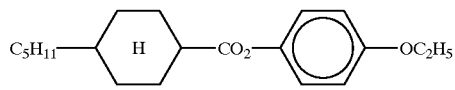
(B59) 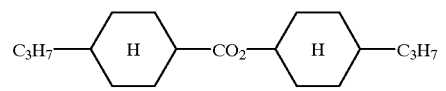
(B60) 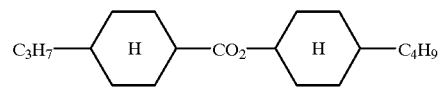
(B61) 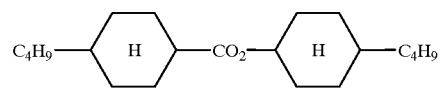
(B62) 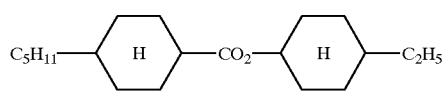
(B63) 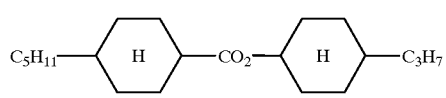
(B64) 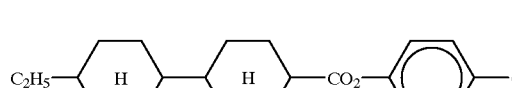
(B65) 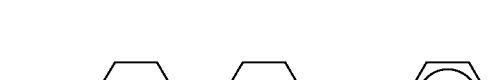
(B66) 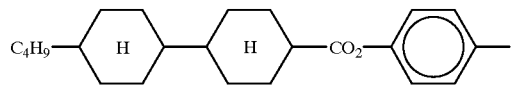
(B67) 
(B68) 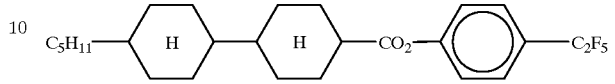
(B69) 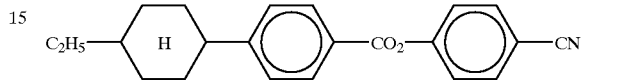
(B70) 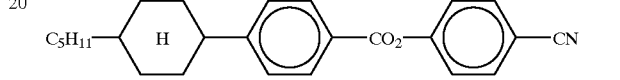
(B71) 
(B72) 
(B73) 
(B74) 
(B75) 
(B76) 
(B77) 
(B78) 

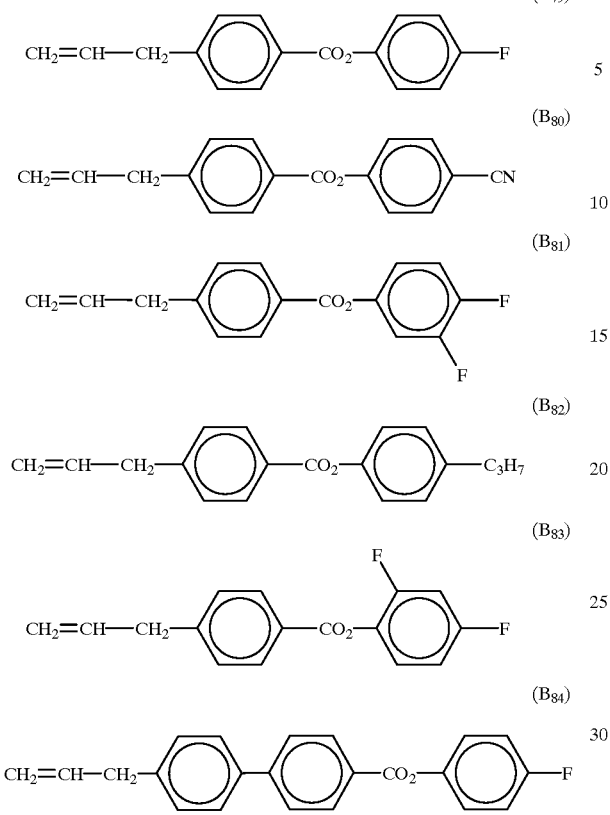

The following general chemical formula (C) and specific chemical formulas ($C_1$) through ($C_{86}$) show liquid crystal pyrimidine compounds which are usable as nematic liquid crystal with a polar group.

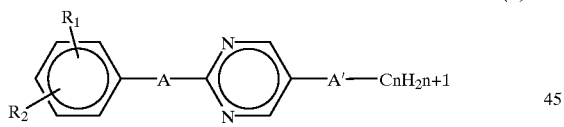

A, A': single bond or phenylene except that both are phenylene $R_1$, $R_2$: hydrogen, fluorine, cyano or alkyl with one to ten carbons except that both are hydrogen n: integer from 2 to 10

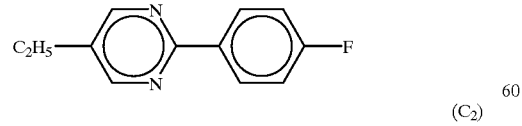

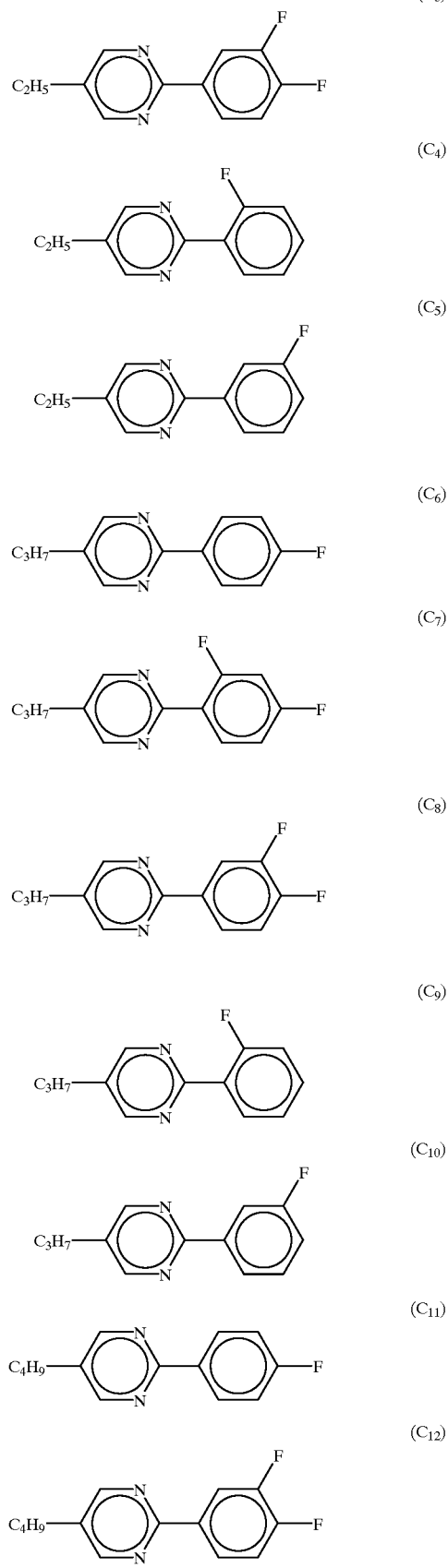

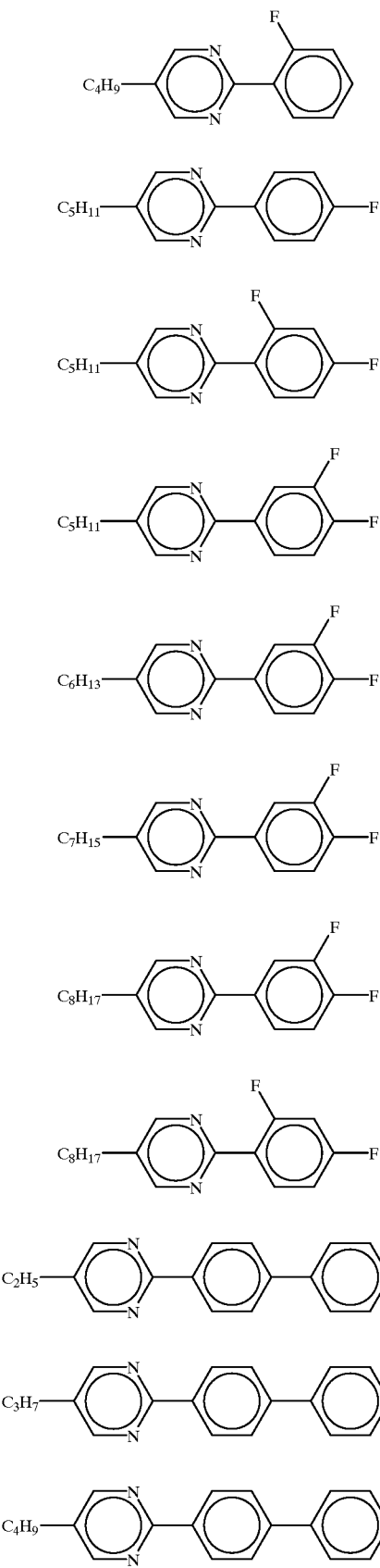
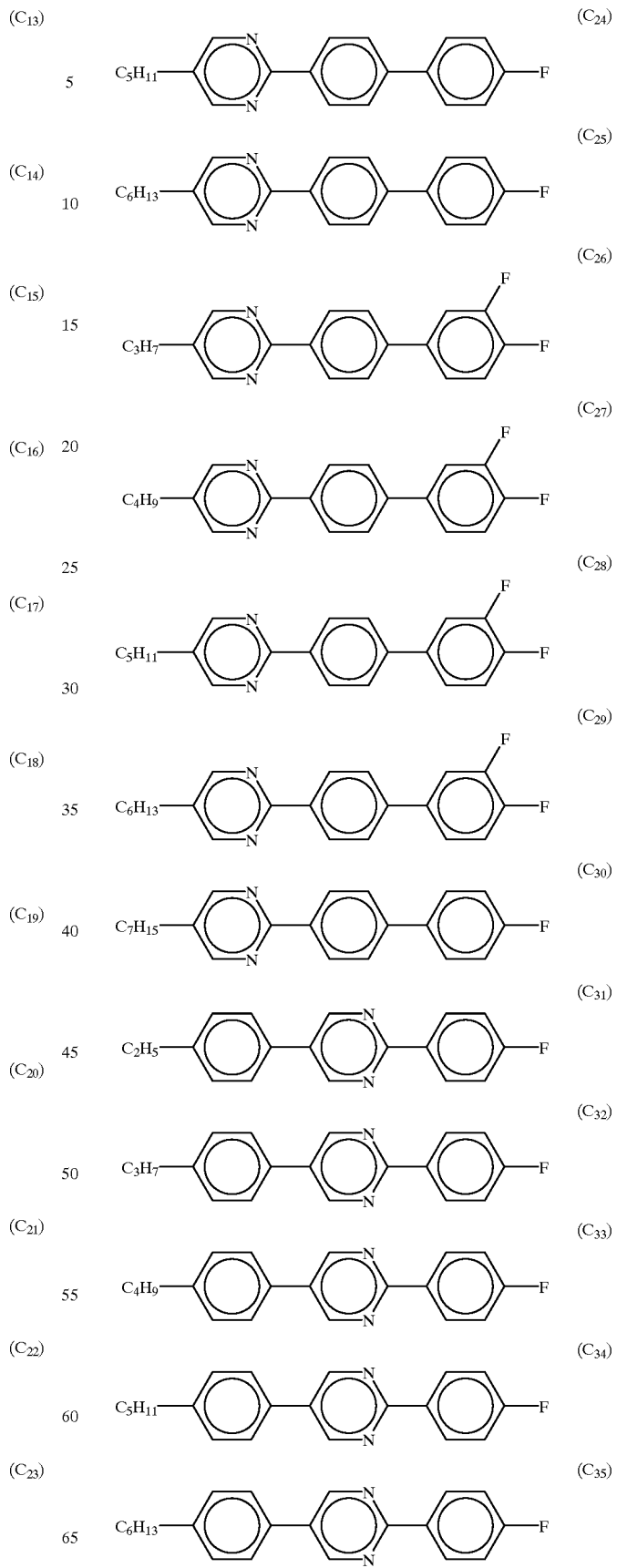

(C36) 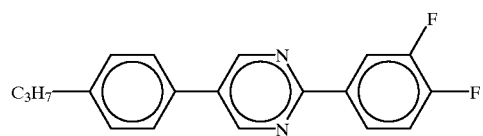
(C37) 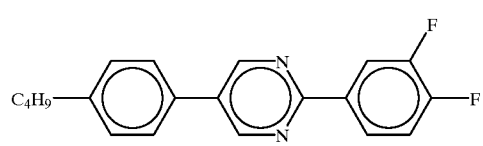
(C38) 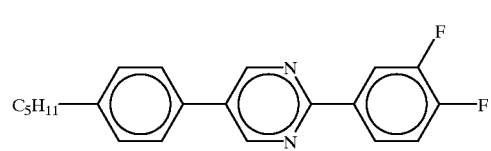
(C39) 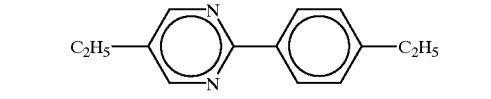
(C40) 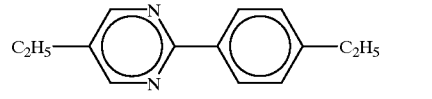
(C41) 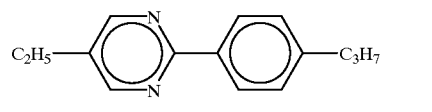
(C42) 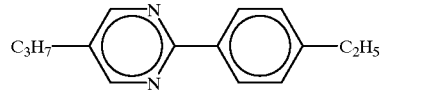
(C43) 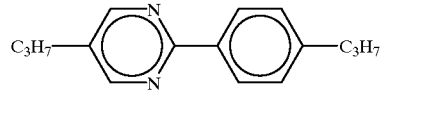
(C44) 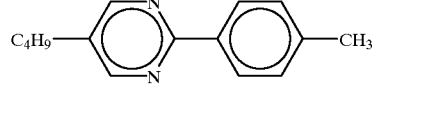
(C45) 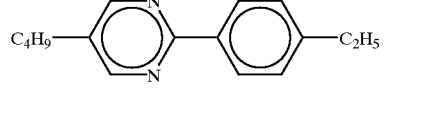
(C46) 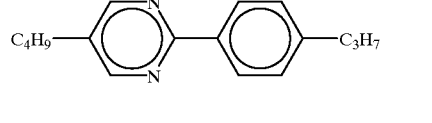
(C47) 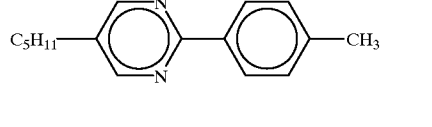
(C48) 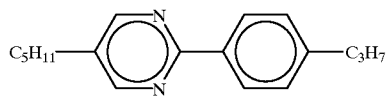
(C49) 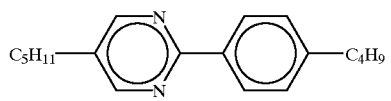
(C50) 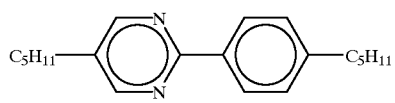
(C51) 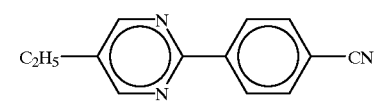
(C52) 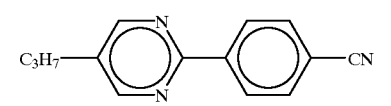
(C53) 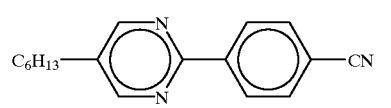
(C54) 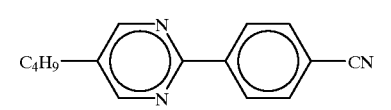
(C55) 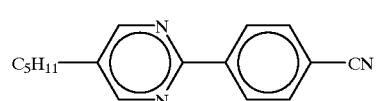
(C56) 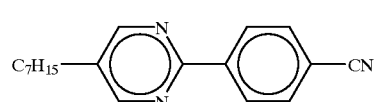
(C57) 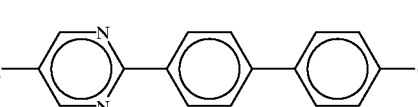
(C58) 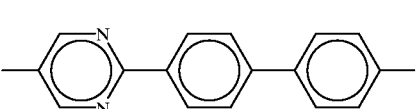
(C59) 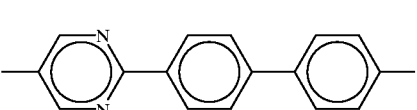
(C60) 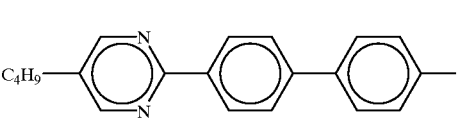

(C61) 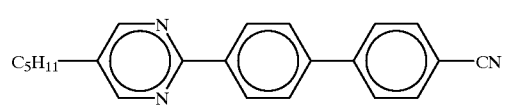
(C62) 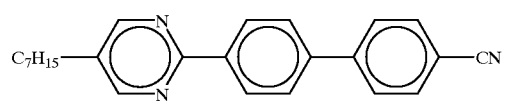
(C63) 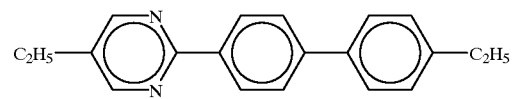
(C64) 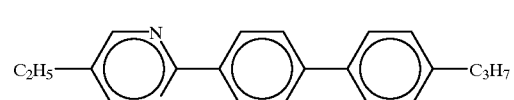
(C65) 
(C66) 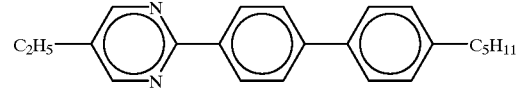
(C67) 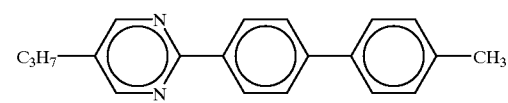
(C68) 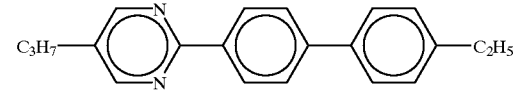
(C69) 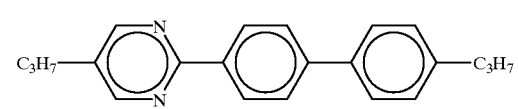
(C70) 
(C71) 
(C72) 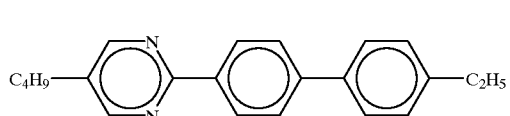
(C73) 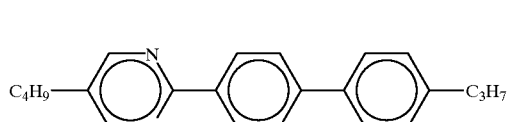
(C74) 
(C75) 
(C76) 
(C77) 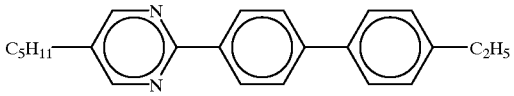
(C78) 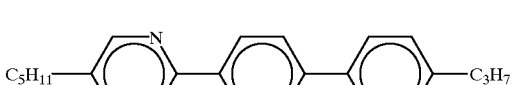
(C79) 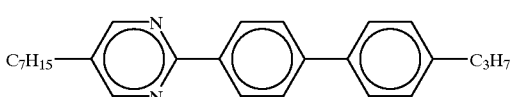
(C80) 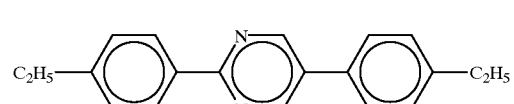
(C81) 
(C82) 

-continued

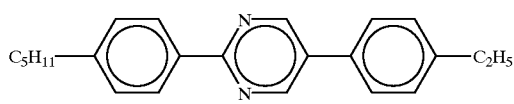
(C83)

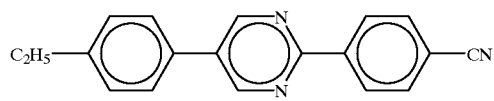
(C84)

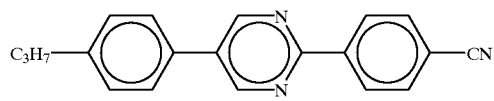
(C85)

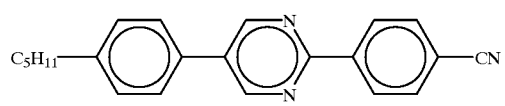
(C86)

Chiral nematic liquid crystal has an advantage in that it is possible to change the pitch of its helical structure by changing the content of the chiral agent, thereby allowing the wavelength to be reflected by the liquid crystal to be controlled. In general, the pitch of the helical structure of liquid crystal molecules is expressed by the term "helical pitch" which is defined by the distance between molecules which are at an angle of 360° to each other along the helical structure.

A chiral agent, when it is added to nematic liquid crystal, twists molecules of the nematic liquid crystal. In other words, by adding a chiral agent to nematic liquid crystal, the liquid crystal molecules are arranged in a helical structure with a specified twisting pitch, whereby the liquid crystal exhibits a cholesteric phase.

Various well-known chiral agents, for example, biphenyl compounds with an optically active group at an end, tarphenyl compounds, ester compounds, pyrimidine compounds, azoxy compounds, tolane compounds, etc. are usable as the chiral agent in this embodiment. Also, cholesteric liquid crystal with a cholesteric ring, of which typical example is cholesteric nonanolate, can be used.

It is possible to add a plurality of chiral agents to nematic liquid crystal. In such a case, the combination may be of chiral agents of the same kind in optical rotatory power or may be of chiral agents of different kinds in optical rotatory power. The use of a combination of a plurality of chiral agents has advantages of changing the transition temperature to isotropic phase of the cholesteric liquid crystal, reducing the variation of the wavelength to be reflected in accordance with the temperature change, and changing the properties, such as the anisotropy of dielectric constant, the anisotropy of refractive index, the viscosity, etc., of the cholesteric liquid crystal, i.e., of improving the performance as a display. The content of the chiral agent(s) is within a range from 10 wt % to 45 wt %, desirably 12 to 45 wt %, more desirably 15 to 45 wt %, and further more desirably 20 to 40 wt %. If the content of the chiral agent(s) is 10 wt % or less, the liquid crystal may not reflect light of the desirable wavelength, and if the content of the chiral agent(s) is 45 wt % or more, the liquid crystal may not exhibit a cholesteric phase and may be solidified.

The following chemical formulas ($D_1$) through ($D_6$) show exemplary chiral agents.

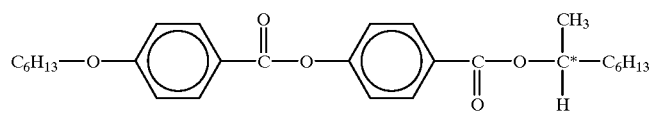
($D_1$)

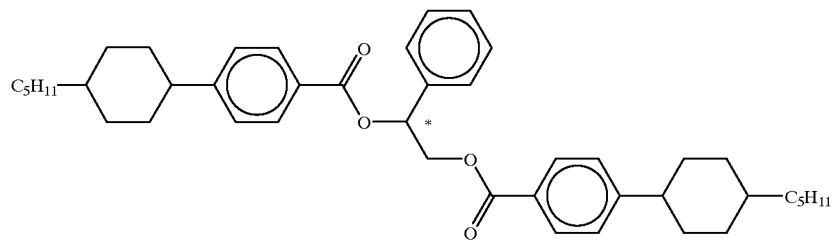
($D_2$)

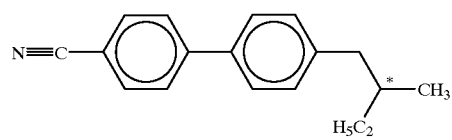
($D_3$)

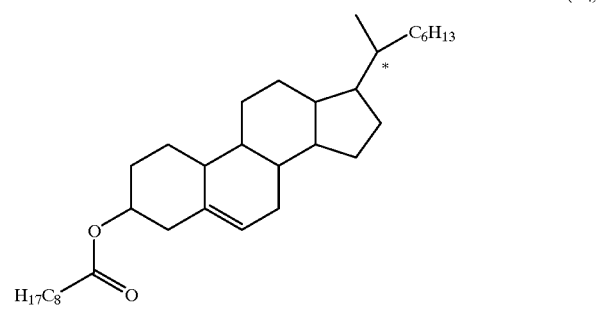
($D_4$)

(D5)
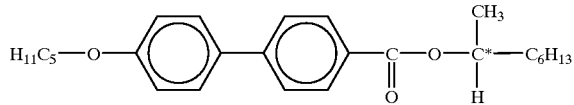

(D6)
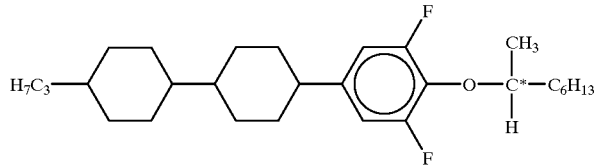

As the dye to be added, various well-known dyes can be used, and ones which are compatible with liquid crystal are preferable. For example, azo compounds, quinon compounds, anthraquinon compounds, dichroic dyes, etc. are usable, and two or more of these dyes can be used. The content of the dye(s) is preferably not more than 3 wt %.

If a color filter is provided instead of adding one or more dyes, the filter layer may be formed by adding a dye to a transparent substance. The filter layer also may be a thin film of a substance which is essentially colored or functions as a dye. It is obvious that the same effect can be obtained merely by using such a filter layer as one of the substrates.

Columnar Structure

First, the configuration of the columnar structure 20 is described. The columnar structure 20 is composed of columns, for example, cylinders, square poles or elliptic cylinders which are arranged in a specified pattern such as a grating or stripes. Preferably, the arrangement of the columns is not random. For example, the columns may be arranged at uniform intervals, at gradually changing intervals, in periodically repeating specified patterns or the like. The arrangement is preferably such a type which enables the substrates 11 and 12 to keep a suitable gap between each other and will never be obstructive to image display. If the columnar structure 20 occupies 1% to 40% of the display area, the device can maintain sufficient strength and make satisfactory performance as a display device.

Next, the material is described. The columnar structure 20 is made of a polymeric composition which is produced by adding a polymerization initiator to polymeric monomer. The polymeric composition is, for example, photosetting resin in the market which is produced by mixing photosetting monomer or oligomer with a photopolymerization initiator. A photopolymerization method in which light is radiated to photosetting resin facilitates the columnar structure 20 to be formed in a desired pattern. Materials of which main components are acrylic ester compounds are especially suited for the columnar structure 20. An acrylic ester compound is an acrylate compound or a methacrylate compound which has two or more allyl groups. It may contain an aromatic ring or the like in the main chain between the allyl groups. Also, it may contain a divalent group such as CO, $CO_2$, $CH_2$, O or the like in the main chain. Further, epoxy acrylate compounds, urethane acrylate compounds, etc. are included in acrylate compounds.

Next, the method of forming the columnar structure 20 is described.

First, an ultraviolet-ray setting compound (columnar structure composition) is filled between one of the substrates with ITO electrodes thereon and a mask with a specified pattern. Alternatively, an ultraviolet-ray setting compound is coated on the ITO electrodes on one of the substrates, and a mask is covered thereon. Then, ultraviolet rays are radiated. Next, the mask is removed, and the compound is removed from the non-radiated portions by a specified solvent. Then, the substrate is dried, so that the compound is hardened to be made into a columnar structure.

Thereafter, the liquid crystal composition is filled between the substrates which sandwich the columnar structure by a vacuum injection method. Alternatively, the liquid crystal composition is dropped on one of the substrates, and while the other substrate is laid over and joined to the substrate, the liquid crystal composition is spread between the substrates.

The following method is also possible: a mixture of a liquid crystal material and a photosetting resin material is filled between glass substrates; while a photomask is covered on one of the substrates, light is radiated, so that the resin is polymerized and separated from the liquid crystal. Thus, the resin part is formed as the columnar structure 20.

Further, in order to regulate the gap between the substrates more accurately, spacers with a smaller size than the thickness of the resin, for example, glass fiber, ball glass, ceramic powder or spherical particles of an organic material is/are arranged between the substrates in forming the columnar structure. Thereby, the gap between the substrates is hardly changed by heat and/or pressure, and voltage unevenness, chromatic unevenness, etc. can be prevented.

Structure of the Second Embodiment

FIG. 2 is a sectional view of a liquid crystal display as the second embodiment of the present invention. FIG. 2 shows the planar state (when a high pulse voltage is applied) of the liquid crystal display. This liquid crystal display is basically the same as the first embodiment shown by FIG. 1. In the second embodiment, the columnar structure is not provided in the display area. In FIG. 2, the same members are provided with the same reference symbols as in FIG. 1.

Structure of the Third Embodiment

Figure 3:
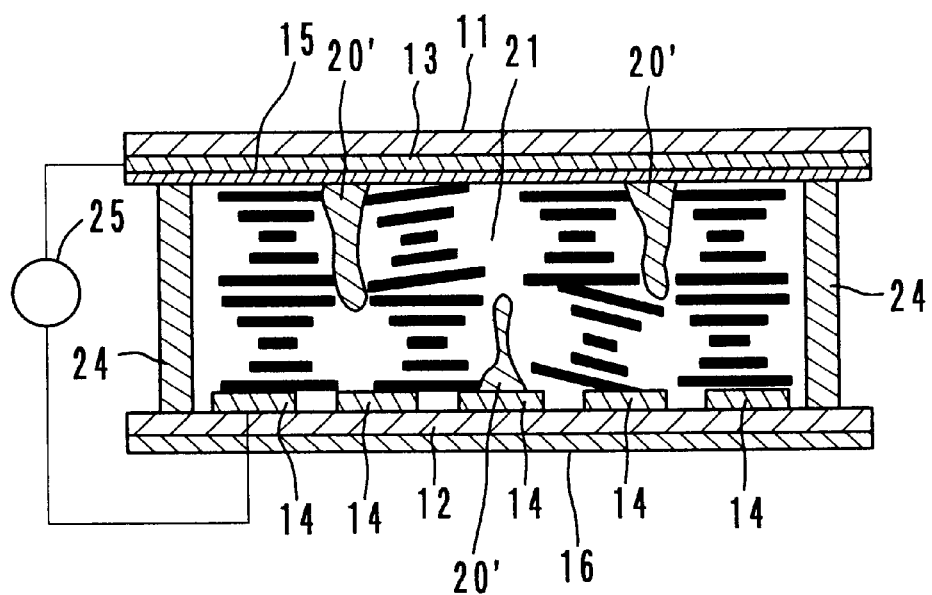
FIG. 3 is a sectional view of a liquid crystal display as the third embodiment.

FIG. 3 is a sectional view of a liquid crystal display as the third embodiment of the present invention. FIG. 3 shows the planar state (when a high pulse voltage is applied) of the liquid crystal display. In this liquid crystal display, between the substrates 11 and 12, a small columnar structure 20', of which columns extend to the middle of the gap between the substrates 11 and 12, is formed. In FIG. 3, the same members are provided with the same reference symbols as in FIG. 2.

Structure of the Fourth Embodiment

The fourth embodiment is a liquid crystal display which is of the same structure as the first embodiment. In the fourth embodiment, the columnar structure is formed by a screen printing method.

In the screen printing method, a screen with a specified pattern is covered on the electrodes on one of the substrates, and a printing material (columnar structure composition) is laid on the screen. Then, a squeegee is moved under a specified pressure, at a specified angle and at a specified speed. Thereby, the material is transferred onto the substrate through the pattern of the screen. Next, the transferred material is heated to be hardened and is dried.

In a case of forming a columnar structure in a screen printing method, the resin material is not necessarily photosetting resin, and thermosetting resin such as epoxy resin, acrylic resin, etc. and thermoplastic resin can be used. As thermoplastic resin, polyvinyl chloride resin, polyvinylidene chloride resin, polyvinyl acetate resin, polyester methacrylate resin, polyester acrylate resin, polystyrene resin, polyamide resin, polyethylene resin, polypropyrene resin, fluororesin, polyurethane resin, polyacrylonitrile resin, polyvinyl ether resin, polyvinyl keton eresin, polyether resin, polyvinyl pyloridone resin, saturated polyester resin, polycarbonate resin, polyether cholorine resin, etc. can be named. It is preferred that such resin is used in a state of paste, and the paste of resin can be obtained, for example, by dissolving resin in a suitable solvent.

After the formation of the columnar structure on one of the substrates by the above-described method, spacers are dispersed on at least one of the substrates. Then, the two substrates are laid on each other with the respective sides with electrodes thereon facing each other, whereby a hollow cell is fabricated. The laminated substrates are pressed from both sides and heated, whereby the resin material of the columnar structure is softened, and thereafter, the substrates are cooled, whereby the resin material is hardened again.

Experimental Example 1

To a nematic liquid crystal mixture (which contains a component with a polar group at 58 wt %) which contains the liquid crystal ester compounds of the chemical formulas ($B_9$), ($B_{10}$), ($B_{11}$), ($B_{12}$), ($B_{13}$), ($B_{65}$) and ($B_{66}$) at 58 wt % and of which transition temperature to isotropic phase is 102° C., the chiral agent of the chemical formula ($D_6$) and the chiral agent of the chemical formula ($D_1$) were added at 29.3 wt % and 3.3 wt %, respectively. Thus, a liquid crystal composition which selectively reflects light of 550 nm was prepared. With respect to this chiral nematic liquid crystal composition, the anisotropy of refractive index was 0.120; the anisotropy of dielectric constant was 20; and the transition temperature to isotropic phase was 90° C. Spacers were provided between glass substrates with electrodes thereon so that the gap could be regulated to 7 μm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 60V was applied between the electrodes for five milliseconds, the liquid crystal came to a planar state (showed green). At that time, the Y value was 17.8; the reflectance was 30%; and the color purity was 78.9%. When. a pulse voltage of 30V was applied for five milliseconds, the liquid crystal came to a focal-conic state (transparent), and the Y value was 2.38. Accordingly, the contrast was 7.48.

The Y value (luminous reflectance) and the color purity (excitation purity) were measured by use of a spectrocolorimeter CM-3700d (made by Minolta Co., Ltd.) which has a white light source. In the experimental examples and comparative examples below, the same spectrocolorimeter was used.

Experimental Example 2

To a nematic liquid crystal mixture (which contains a component with a polar group at 49 wt %/o) which contains the liquid crystal pyrimidine compounds of the chemical formulas ($C_{14}$), ($C_{22}$), ($C_{23}$) and ($C_{24}$) at 29 wt % and the liquid crystal tolane compounds with a polar group of the chemical formulas ($A_{43}$) ($A_{44}$) and ($A_{45}$) at 20 wt % and of which transition temperature to isotropic phase is 130° C., the chiral agent of the chemical formula ($D_3$) and the chiral agent of the chemical formula ($D_1$) were added at 15.8 wt % and 17.5 wt %, respectively. Thus, a liquid crystal composition which selectively reflects light of 550 nm was prepared. With respect to this chiral nematic liquid crystal composition, the anisotropy of refractive index was 0.215; the anisotropy of dielectric constant was 8; and the transition temperature to isotropic phase was 75° C. Spacers were provided between glass substrates with electrodes thereon so that the gap could be regulated to 7 μm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 80V was applied between the electrodes for five milliseconds, the liquid crystal came to a planar state (showed green). At that time, the Y value was 25.11; the reflectance was 39%; and the color purity was 72%. When a pulse voltage of 50V was applied for five milliseconds, the liquid crystal came to a focal-conic state (transparent), and the Y value was 2.5. Accordingly, the contrast was 10.04.

Comparative Example 1

To a nematic liquid crystal mixture (which contains a component with a polar group at 18 wt %) which contains the liquid crystal ester compounds of the chemical formulas ($B_9$), ($B_{10}$), ($B_{11}$), ($B_{12}$), ($B_{13}$), ($B_{65}$) and ($B_{66}$) at 18 wt % and of which transition temperature to isotropic phase is 90° C., the chiral agent of the chemical formula ($D_5$) and the chiral agent of the chemical formula ($D_1$) were added at 26 wt % and 3.6 wt %, respectively. Thus, a liquid crystal composition which selectively reflects light of 550 nm was prepared. With this chiral nematic liquid crystal composition, the anisotropy of referavtive index was 0.154; the anisotropy of dielectric constant was 7; and the transition temperature to isotropic phase was 70° C. Spacers were provided between glass substrates with electrodes thereon so that the gap could be regulated to 7 μm, and the liquid crystal composition was filled between the substrates. Further, on the side opposite the light incidence side, a light absorbing layer of black. was provided. In this way, a liquid crystal display of the structure shown by FIG. 2 was produced.

In the liquid crystal display, when a pulse voltage of 140V was applied between the electrodes for five milliseconds, the liquid crystal came to a planar state (showed green). At that time, the Y value was 18.5; the reflectance was 24%; and the color purity was 65%. When a pulse voltage of 90V was applied for five milliseconds, the liquid crystal came to a focal-conic state (transparent), and the Y value was 4.5. Accordingly, the contrast was 4.11.

Experimental Example 3

To a nematic liquid crystal mixture (which contains a component with a polar group at 49 wt %) which contains the liquid crystal pyrimidine compounds of the chemical formulas ($C_{14}$), ($C_{22}$), ($C_{23}$) and ($C_{24}$) at 29 wt % and the liquid crystal tolan compounds with a polar group of the chemical formulas ($A_{43}$), ($A_{44}$) and ($A_{45}$) at 20 wt % and of which transition temperature to isotropic phase is 130° C., the chiral agent of the chemical formula ($D_3$) and the chiral agent of the chemical formula ($D_2$) were added at 17.8 wt % and 7.6 wt %, respectively. Thus, a liquid crystal composition which selectively reflects light of 490 nm was prepared. With respect to this chiral nematic liquid crystal composition, the anisotropy of refractive index was 0.20; the anisotropy of dielectric constant was 13.3; and the transition temperature to isotropic phase was 70° C. Spacers were provided between glass substrates with electrodes thereon so that the gap could be regulated to 56 µm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 60V was applied between the electrodes for five milliseconds, the liquid crystal came to a planar state (showed blue). At that time, the Y value was 9.56; the reflectance was 30%; and the color purity was 59.6%. When a pulse voltage of 35V was applied for five milliseconds, the liquid crystal came to a focal-conic state (transparent), and the Y value was 2.35. Accordingly, the contrast was 4.07.

Comparative Example 2

To a nematic liquid crystal mixture (which contains a component with a polar group at 58 wt %) which contains the liquid crystal ester compounds of the chemical formulas ($B_9$), ($B_{10}$), ($B_{11}$), ($B_{12}$), ($B_{13}$), ($B_{65}$) and ($B_{66}$) at 58 wt % and of which transition temperature to isotropic phase is 102° C., the chiral agent of the chemical formula ($D_6$) and the chiral agent of the chemical formula ($D_1$) were added at 32.5 wt % and 2.9 wt %, respectively. Thus, a liquid crystal composition which selectively reflects light of 480 nm was prepared. With this chiral nematic liquid crystal composition, the anisotropy of referactive index was 0.090; the anisotropy of dielectric constant was 15; and the transition temperature to isotropic phase was 80° C. Spacers were provided between glass substrates with electrodes thereon so that the gap could be regulated to 5 µm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 50V was applied between the electrodes for five milliseconds, the liquid crystal came to a planar state (showed blue). At that time, the Y value was 5.54; the reflectance was 22%, and the color purity was 63.2%. When a pulse voltage of 30V was applied for five milliseconds, the liquid crystal came to a focal-conic state (transparent), and the Y value was 2.0. Accordingly, the contrast was 2.77.

Comparative Example 3

To a nematic liquid crystal mixture (which contains a component with a polar group at 54 wt %) which contains the liquid crystal pyrimidine compounds of the chemical formulas ($C_8$), ($C_{16}$), ($C_{22}$), ($C_{23}$) and ($C_{24}$) at 27 wt % and of which transition temperature to isotropic phase is 68° C., the chiral agent of the chemical formula ($D_4$) and the chiral agent of the chemical formula ($D_1$) were added 18.2 wt % and 17 wt %, respectively. Thus, a liquid crystal composition which selectively reflects light of 490 nm was prepared. With respect to this chiral nematic liquid crystal composition, the anisotropy of refractive index was 0.168; the anisotropy of dielectric constant was 3.8; and the transition temperature to isotropic phase was 50° C. Spacers were provided between glass substrates with electrodes thereon so that the gap could be regulated to 5 µm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 120V was applied between the electrodes for five milliseconds, the liquid crystal came to a planar state (showed blue). At that time, the Y value was 8.2; the reflectance was 29.7%; and the color purity was 59%. When a pulse voltage of 60V was applied for five milliseconds, the liquid crystal came to a focal-conic state (transparent), and the Y value was 2.34 Accordingly, the contrast was 3.5.

Experimental Example 4

To a nematic liquid crystal mixture ( which contains a component with a polar group at 45 wt %) which contains the liquid crystal pyrimidine compounds of the chemical formulas ($C_{14}$), ($C_{22}$,) and ($C_{23}$) at 21 wt % and the liquid crystal tolane compounds with a polar group of the chemical formulas ($A_{43}$) and ($A_{44}$) at 24 wt % and of which transition temperature to isotropic phase is 94° C. the chiral agent of the chemical formula ($D_3$) and the chiral agent of the chemical formula ($D_2$) were added at 17 wt % and 5 wt %, respectively. Thus, a liquid crystal composition which selectively reflects light of 680 nm was prepared. With respect to this chiral nematic liquid crystal composition, the anisotropy of refractive index was 0.2; the anisotropy of dielectric constant was 8; and the transition temperature to isotropic phase was 70° C. Spacers were provided between glass substrates with electrodes thereon so that the gap could be regulated to 7 µm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 80V was applied between the electrodes for five milliseconds, the liquid crystal came to a planar state (showed red). At that time, the Y value was 6.04; the reflectance was 31.5%; and the color purity was 79%. When a pulse voltage of 50V was applied for five milliseconds, the liquid crystal came to a focal-conic state (transparent), and the Y value was 1.22. Accordingly, the contrast was 4.95.

Experimental Example 5

To a nematic liquid crystal mixture (which contains a component with a polar group at 66 wt %) which contains the liquid crystal pyrimidine compounds of the chemical formulas ($C_{14}$), ($C_{22}$), ($C_{23}$) and ($C_{24}$) at 27 wt % and the liquid crystal tolane compounds with a polar group of the chemical formulas ($A_{43}$), ($A_{44}$) and ($A_{46}$), ($A_{85}$), ($A_{86}$) and ($A_{87}$) at 39 wt % and of which transition temperature to isotropic phase is 122° C., the chiral agent of the chemical formula ($D_3$) and the chiral agent of the chemical formula ($D_1$) were added at 12.3 wt % and 14.4 wt %, respectively. Thus, a liquid crystal composition which selectively reflects light of 680 nm was prepared. With respect to this chiral nematic liquid crystal composition, the anisotropy of refractive index was 0.18; the anisotropy of dielectric constant was 8; and the transition temperature to isotropic phase was 75° C. Spacers were provided between glass substrates with electrodes thereon so that the gap could be regulated to 7 µm, and the liquid crystal composition was filled between the substrates. Further, a color filter was provided on the light incidence side, and a light absorbing layer of black was provided on the opposite side. In this way, a liquid crystal display of the structure shown by FIG. 2 was produced.

In the liquid crystal display, when a pulse voltage of 80V was applied between the electrodes for five milliseconds, the liquid crystal came to a planar state (showed red). At that time, the Y value was 6; the reflectance was 32.5%; and the color purity was 80.5%. When a pulse voltage of 50V was applied for five milliseconds, the liquid crystal came to a focal-conic state (transparent), and the Y value was 1.22. Accordingly, the contrast was 4.91.

Experimental Example 6

To a nematic liquid crystal mixture (which contains a component with a polar group at 80 wt %) which contains the liquid crystal ester compounds of the chemical formulas $(B_{21})$, $(B_{22})$, $(B_{23})$, $(B_{24})$, $(B_{27})$ and $(B_{28})$ at 52 wt % and the liquid crystal tolane compounds with a polar group of the chemical formulas $(A_{43})$, $(A_{44})$ and $(A_{46})$ at 28 wt % and of which transition temperature to isotropic phase is 104° C., the chiral agent of the chemical formula $(D_3)$ and the chiral agent of the chemical formula $(D_2)$ were added at 8.8 wt % and 3.2 wt %, respectively. Thus, a liquid crystal composition which selectively reflects light of 680 nm was prepared. With respect to this chiral nematic liquid crystal composition, the anisotropy of refractive index was 0.190; the anisotropy of dielectric constant was 28; and the transition temperature to isotropic phase was 80° C. Spacers were provided between glass substrates with electrodes thereon so that the gap could be regulated to 7 μm, and the liquid crystal composition was filled between the substrates. Further, a color filter was provided on the light incidence side, and a light absorbing layer of black was provided on the opposite side. In this way, a liquid crystal display of the structure shown by FIG. 2 was produced.

In the liquid crystal display, when a pulse voltage of 60V was applied between the electrodes for five milliseconds, the liquid crystal came to a planar state (showed red). At that time, the Y value was 6.28;. the reflectance was 33%; and the color purity was 83%. When a pulse voltage of 35V was applied for five milliseconds, the liquid crystal came to a focal-conic state (transparent), and the Y value was 1.19. Accordingly, the contrast was 5.28.

Comparative Example 4

To a nematic liquid crystal mixture (which contains a component with a polar group at 18 wt %) which contains the liquid crystal tolane compounds with a polar group of the chemical formulas $(A_{21})$, $(A_{61})$ and $(A_{63})$ at 18 wt % and of which transition temperature to isotropic phase is 95° C., the chiral agent of the chemical formula $(D_3)$ and the chiral agent of the chemical formula $(D_2)$ were added at 10.9 wt % and 4.6 wt %, respectively. Thus, a liquid crystal composition which selectively reflects light of 680 nm was prepared. With respect to this chiral nematic liquid crystal composition, the anisotropy of refractive index was 0.25; the anisotropy of dielectric constant was 6.3; and the transition temperature to isotropic phase was 70° C. Spacers were provided between glass substrates with electrodes thereon so that the gap could be regulated to 7 μm, and the liquid crystal composition was filled between the substrates. Further, a color filter was provided on the light incidence side, and a light absorbing layer of black was provided on the opposite side. In this way, a liquid crystal display of the structure shown by FIG. 2 was produced.

In the liquid crystal display, when a pulse voltage of 120V was applied between the electrodes for five milliseconds, the liquid crystal came to a planar state (showed red). At that time, the Y value was 5.95; the reflectance was 25%; and the color purity was 81.9%. When a pulse voltage of 80V was applied for five milliseconds, the liquid crystal came to a focal-conic state (transparent), and the Y value was 1.75. Accordingly, the contrast was 3.4.

Comparative Example 5

To a nematic liquid crystal mixture which contains the liquid crystal tolane compounds with no polar groups of the chemical formulas $(A_{12})$, $(A_{24})$ and $(A_{38})$ at 100 wt % and of which transition temperature to isotropic phase is 65° C., the chiral agent of the chemical formula $(D_3)$ and the chiral agent of the chemical formula $(D_6)$ were added at 12.5 wt % and 5 wt %, respectively. Thus, a liquid crystal composition which selectively reflects light of 680 nm was prepared. With respect to this chiral nematic liquid crystal composition, the anisotropy of refractive index was 0.235; the anisotropy of dielectric constant was 0 (could not measured); and the transition temperature to isotropic phase was 50° C. Spacers were provided between glass substrates with electrodes thereon so that the gap could be regulated to 7 μm, and the liquid crystal composition was filled between the substrates. Further, a color filter was provided on the light incidence side, and a light absorbing layer of black was provided on the opposite side. In this way, a liquid crystal display of the structure shown by FIG. 2 was produced.

In the liquid crystal display, even when a pulse voltage was applied between the electrodes, any change did not occur to the liquid crystal.

Experimental Example 7

To a nematic liquid crystal mixture (which contains a component with a polar group at 32 wt %) which contains the liquid crystal tolane compounds with no polar groups of the chemical formulas $(A_1)$, $(A_2)$, $(A_4)$, $(A_7)$, $(A_8)$, $(A_{48})$, $(A_{49})$ and $(A_{51})$ at 35 wt %, the liquid crystal tolane compounds with a polar group of the chemical formulas $(A_{43})$, $(A_{44})$ and $(A_{45})$ at 15 wt % and the liquid crystal pyrimidine compounds of the chemical formulas $(C_{14})$, $(C_{22})$ and $(C_{23})$ at 17 wt % and of which transition temperature to isotropic phase is 97° C., the chiral agent of the chemical formula $(D_3)$ and the chiral agent of the chemical formula $(D_1)$ were added at 12.8 wt % and 14.3 wt %, respectively. Thus, a liquid crystal composition which selectively reflects light of 680 nm was prepared. With respect to this chiral nematic liquid crystal composition, the anisotropy of refractive index was 0.198; the anisotropy of dielectric constant was 6.8; and the transition temperature to isotropic phase was 70° C. Further, a dichroic dye SI426 (made by Mitsui Toatsu Co., Ltd.) was mixed in the liquid crystal composition at 0.5 wt %. Spacers were provided between glass substrates with electrodes thereon so that the gap could be regulated to 7 μm, and the liquid crystal composition was filled between the substrates. Further, a light absorbing layer of black was provided on the side opposite the light incidence side. In this way, a liquid crystal display of the structure shown by FIG. 2 was produced.

In the liquid crystal display, when a pulse voltage of 95V was applied between the electrodes for five milliseconds, the liquid crystal came to a planar state (showed red). At that time, the Y value was 6.22; the reflectance was 32.5%; and the color purity was 79%. When a pulse voltage of 60V was applied for five milliseconds, the liquid crystal came to a focal-conic state (transparent), and the Y value was 1.36. Accordingly, the contrast was 4.57.

Although the present invention has been described in connection with the preferred embodiments above, it is to be noted that various changes and modifications are possible to those who are skilled in the art. Such changes and modifications are to be understood as being within the present invention.

What is claimed is:

1. A liquid crystal composition which exhibits a cholesteric phase at room temperature, comprising:
   a nematic liquid crystal composition which contains a nematic liquid crystal component with a polar group at not less than 25 weight percent of the liquid crystal composition and a transition temperature to an isotropic phase is within a range from 70° C. to 150° C.; and
   a chiral agent which is added to the nematic liquid crystal composition at a ratio within a range from 10 weight percent to 45 weight percent of the liquid crystal composition;
   wherein said liquid crystal composition has an anisotropy of refractive index of 0.10 to 0.22 and an anisotropy of dielectric constant of 5 to 30.

2. A liquid crystal composition as claimed in claim 1, wherein the liquid crystal component with a polar group in the nematic liquid crystal composition contains a liquid crystal ester compound or a liquid crystal pyrimidine compound.

3. A liquid crystal composition as claimed in claim 1, wherein the liquid crystal component with a polar group in the nematic liquid crystal composition contains a liquid crystal compound with at least one polar group selecting from the group consisting of fluorine, fluoroalkyl and cyano.

4. A liquid crystal composition as claimed in claim 3, wherein the liquid crystal component with a polar group in the nematic liquid crystal composition is a compound selected from the group consisting of liquid crystal tolane compounds, liquid crystal ester compounds and liquid crystal pyrimidine compounds.

5. A liquid crystal composition as claimed in claim 1, wherein the anisotropy of refractive index is within a range from 0.12 to 0.20.

6. A liquid crystal composition as claimed in claim 1, wherein the chiral agent is contained in the liquid crystal composition at a ratio within a range from 12 weight percent to 45 weight percent of the liquid crystal composition.

7. A liquid crystal composition as claimed in claim 1, which contains a plurality of chiral agents.

8. A liquid crystal light modulating device comprising:
   a pair of substrates, at least one of which is light transmitting;
   the liquid crystal composition as claimed in claim 1 provided between the substrates; and
   a space maintaining member provided between the substrates.

9. A liquid crystal composition comprising:
   a nematic liquid crystal composition which contains a nematic liquid crystal component with a polar group at not less than 25 weight percent of the nematic liquid crystal composition and a transition temperature to an isotropic phase is within a range from 70° C. to 150° C.; and
   a predetermined ratio of a chiral agent to the nematic liquid crystal composition, the predetermined ratio being sufficiently high for said nematic liquid crystal composition, as a whole, to exhibit a cholesteric phase at room temperature;
   wherein said nematic liquid crystal composition, as a whole, has an anisotropy of refractive index of 0.10 to 0.22 and an anisotropy of a dielectric constant of 5 to 30.

10. A liquid crystal composition as claimed in claim 9, wherein the liquid crystal component contains a liquid crystal ester compound or a liquid pyrimidine compound.

11. A liquid crystal composition as claimed in claim 9, wherein the liquid crystal component contains a liquid crystal compound with at least one polar group selected from the group consisting of fluorine, fluoroalkyl and cyano.

12. A liquid crystal composition as claimed in claim 11, wherein the liquid crystal component is a compound selected from the group consisting of liquid crystal tolane compounds, liquid crystal ester compounds and liquid crystal pyrimidine compounds.

13. A liquid crystal composition as claimed in claim 9, wherein the anisotropy of refractive index is within a range from 0.12 to 0.20.

14. A liquid crystal composition as claimed in claim 9, which contains a plurality of chiral agents.

15. A liquid crystal light modulating device comprising:
   a pair of substrates, at least one of which is light transmitting;
   the liquid crystal composition as claimed in claim 9 provided between the substrates; and
   a space maintaining member provided between the substrates.

* * * * *

UNITED STATES PATENT AND TRADEMARK OFFICE
CERTIFICATE OF CORRECTION

PATENT NO. : 6,348,961 B2  
DATED : February 19, 2002  
INVENTOR(S) : Masako Iwamatsu et al.

It is certified that error appears in the above-identified patent and that said Letters Patent is hereby corrected as shown below:

Column 2,
Line 13, delete "tolan", and insert -- tolane --.
Line 20, delete "tolan", and insert -- tolane --.
Line 32, after the second instance of "a", delete ":".

Column 3,
Line 28, after "crystal", delete ".".

Column 33,
Line 13, delete "keton eresin", and insert -- ketone resin --.
Line 15, delete "cholorine", and insert -- chlorine --.
Line 54, after "When", delete ".".
Line 67, delete "49 wt %/o)", and insert -- 49wt%) --.

Column 34,
Line 3, after "($A_{43}$)", insert -- , --.
Line 48, after "black", delete ".".

Column 36,
Line 19, delete "(  which", and insert -- (which --.
Line 22, delete "($C_{22'}$)", and insert -- ($C_{22}$) --.
Line 25, delete "C.", and insert -- C, --.

Signed and Sealed this

Twenty-fourth Day of December, 2002

JAMES E. ROGAN  
*Director of the United States Patent and Trademark Office*